(12) United States Patent
Ikegami

(10) Patent No.: US 6,745,334 B1
(45) Date of Patent: Jun. 1, 2004

(54) IMAGE FORMING APPARATUS AND METHOD OF CONTROLLING SAME

(75) Inventor: Hideyuki Ikegami, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/248,112

(22) Filed: Feb. 11, 1999

(30) Foreign Application Priority Data

Feb. 16, 1998 (JP) ............................................. 10-033374

(51) Int. Cl.$^7$ ............................... H04L 9/32; H04N 1/00
(52) U.S. Cl. ........................ 713/202; 358/1.6; 358/402
(58) Field of Search .................................. 713/200, 201, 713/202; 711/163, 164, 154; 709/226, 229, 225, 223, 228; 345/741, 743; 358/1.6, 402

(56) References Cited

U.S. PATENT DOCUMENTS

| | | | | |
|---|---|---|---|---|
| 4,893,333 A | * | 1/1990 | Baran et al. ............ 379/100.11 |
| 5,077,795 A | * | 12/1991 | Rourke et al. ............... 271/298 |
| 5,435,544 A | * | 7/1995 | Mandel ....................... 395/828 |
| 5,537,626 A | * | 7/1996 | Kraslavsky et al. ........... 380/55 |
| 5,617,528 A | * | 4/1997 | Stechmann et al. ......... 715/517 |
| 5,931,948 A | * | 8/1999 | Morisawa et al. .......... 713/202 |
| 5,996,029 A | * | 11/1999 | Sugiyama et al. ............. 710/15 |
| 6,067,531 A | * | 5/2000 | Hoyt et al. ..................... 705/35 |
| 6,182,225 B1 | * | 1/2001 | Haguida et al. ............. 713/201 |
| 6,307,640 B1 | * | 10/2001 | Motegi ....................... 358/1.14 |
| 6,621,592 B1 | * | 9/2003 | Takayama et al. ......... 358/1.16 |
| 6,634,559 B2 | * | 10/2003 | Shioda et al. ............... 235/487 |
| 2001/0000360 A1 | * | 4/2001 | Shibata ....................... 713/202 |
| 2001/0048535 A1 | * | 12/2001 | Usami ....................... 358/1.18 |
| 2003/0133152 A1 | * | 7/2003 | Matsueda .................. 358/1.15 |
| 2003/0179404 A1 | * | 9/2003 | Matsueda .................. 358/1.15 |

* cited by examiner

*Primary Examiner*—Ayaz Sheikh
*Assistant Examiner*—Christopher Revak
(74) *Attorney, Agent, or Firm*—Fitzpatrick, Cella, Harper & Scinto

(57) ABSTRACT

Personal box areas allocated to respective ones of individuals are provided in an image memory. Each personal box area is associated with a name and a first password or a second password if the first password has not been registered. When the content of a personal box is to be output, the first password is consulted if it has been registered. If the first password has not been registered, then the content of the personal box can be output without a password. In a case where a personal box is to be deleted, the first password is consulted if it has been registered. If the first password has not been registered, then the second password is consulted to determine whether the deletion operation is authorized.

41 Claims, 20 Drawing Sheets

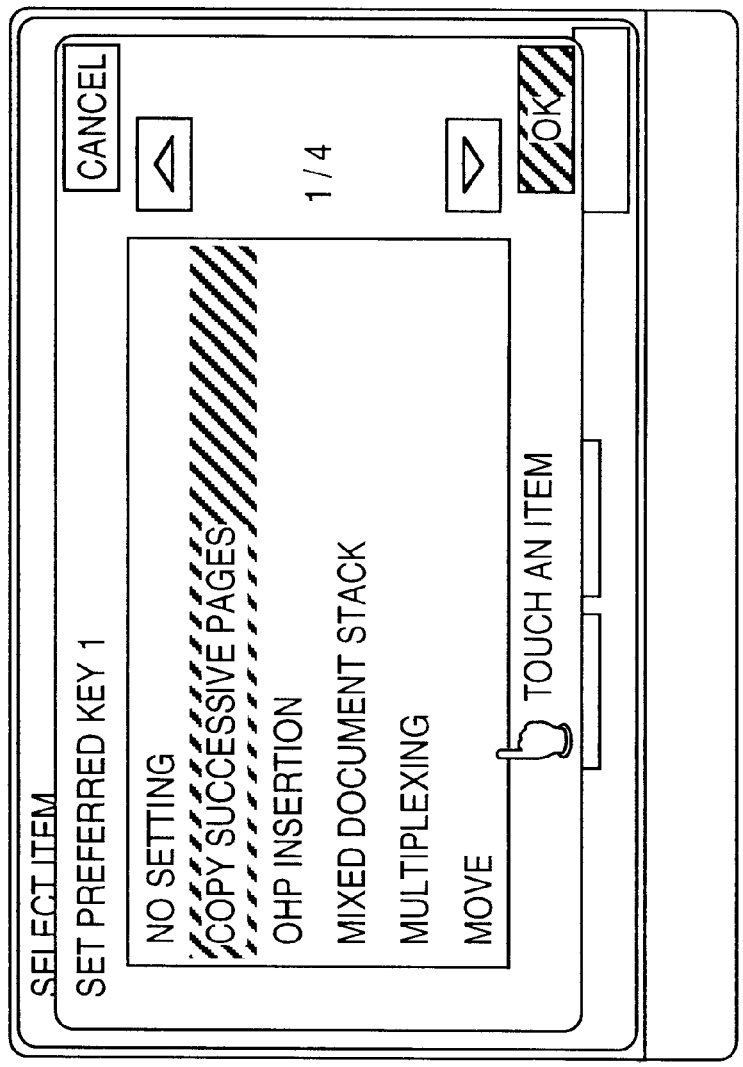

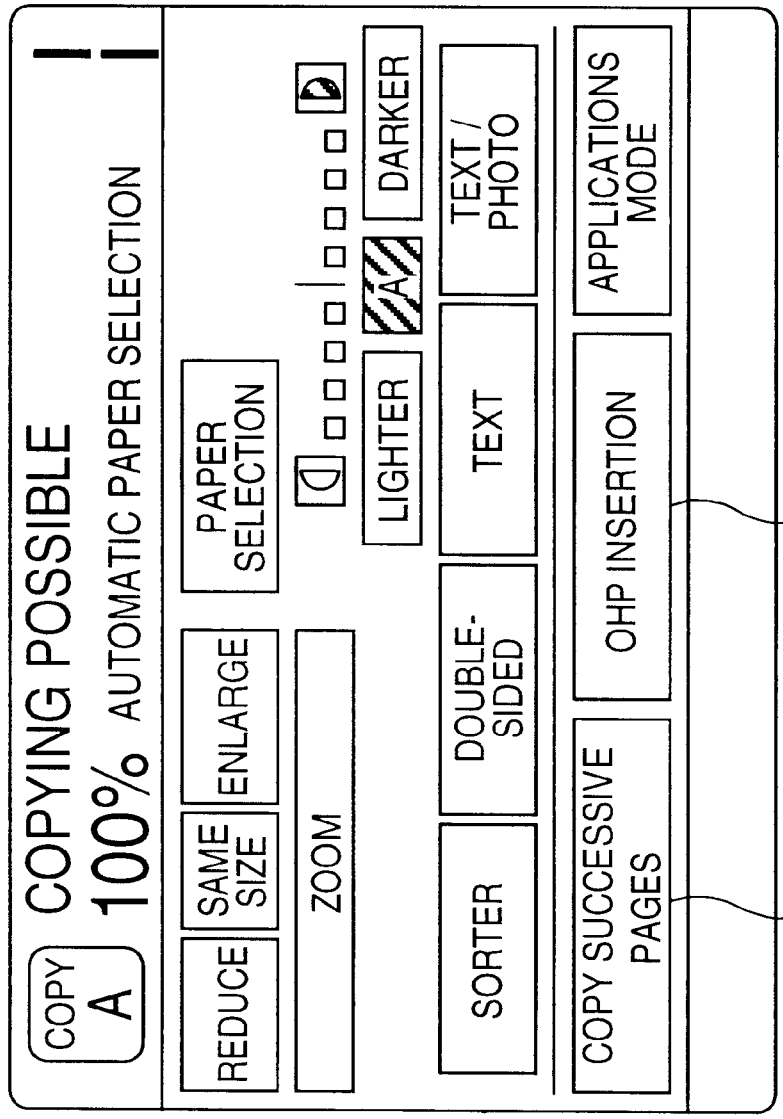

IMAGE FORMING APPARATUS AND METHOD OF CONTROLLING SAME

BACKGROUND OF THE INVENTION

This invention relates to an image forming apparatus having a personal box for storing, on a per-identifier basis, a text image that is to be printed, as well as to a method of controlling this apparatus.

A digital copier known in the art has a function for electronically sorting PDL (Page Description Language) images, wherein image data that has been read in by a scanner or image data obtained by receiving and bitmapping PDL data that has been transmitted from a host computer is stored temporarily in a memory such as a hard disk, and designated image data is repeatedly read out of the memory, printed out and sorted.

Further, a digital copier thus equipped with a hard disk may also be provided with a personal box function. With a personal box function, a storage area on a hard disk or the like is divided into areas, which are referred to as personal boxes, that correspond to respective users, and image data bitmapped from PDL data sent from a host is stored temporarily in the personal boxes on a per-user basis. When stored image data is to be output, a personal box is designated from the control panel of the digital copier as needed and the image data that has been read out from the area of this personal box is printed out.

In an apparatus of this kind, a password is sometimes used in order to make it impossible to access image data without permission. When performing printing, for example, a password for accessing a personal box is requested, the password is compared with passwords that have been registered in advance for respective ones of the personal boxes, and printing is carried out only if passwords match. The password is used to demonstrate the legitimacy of the operator by being compared with the registered passwords not only when printing is performed but also when maintenance such as deletion of a personal box per se or alteration of the name of the personal box is performed.

In an apparatus in which passwords are compared to gain access to a personal box, whether or not registration of a password is required or not can be selected. With such an apparatus, data desired to be concealed from other individuals can be protected by registering a password for the personal box in which the data will be stored. Data desired to be shared with other individuals can be made accessible to anyone if no password is registered for the personal box in which this data is stored.

Though the conventional apparatus described above is advantageous in that anyone can use a personal box for which a password has not been registered, a drawback is that anyone can also perform maintenance such as deleting the personal box itself or changing the name thereof.

SUMMARY OF THE INVENTION

Accordingly, an object of the present invention is to provide an image forming apparatus and a method of controlling the same in which, by always requiring registration of a password for maintenance of a personal box, a password comparison is made at the time of maintenance so that an individual other than a legitimate user is not allowed to perform maintenance on this personal box even if the personal box is one for which a password is not necessary when printing data from the box.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrated embodiments of the invention and, together with the description, serve to explain the principles of the invention.

FIGS. 8A and 8B are diagrams showing an operation for setting preferred function keys of copier operations performed by the digital copier;

DESCRIPTION OF THE PREFERRED EMBODIMENTS

First Embodiment

Figure 1:
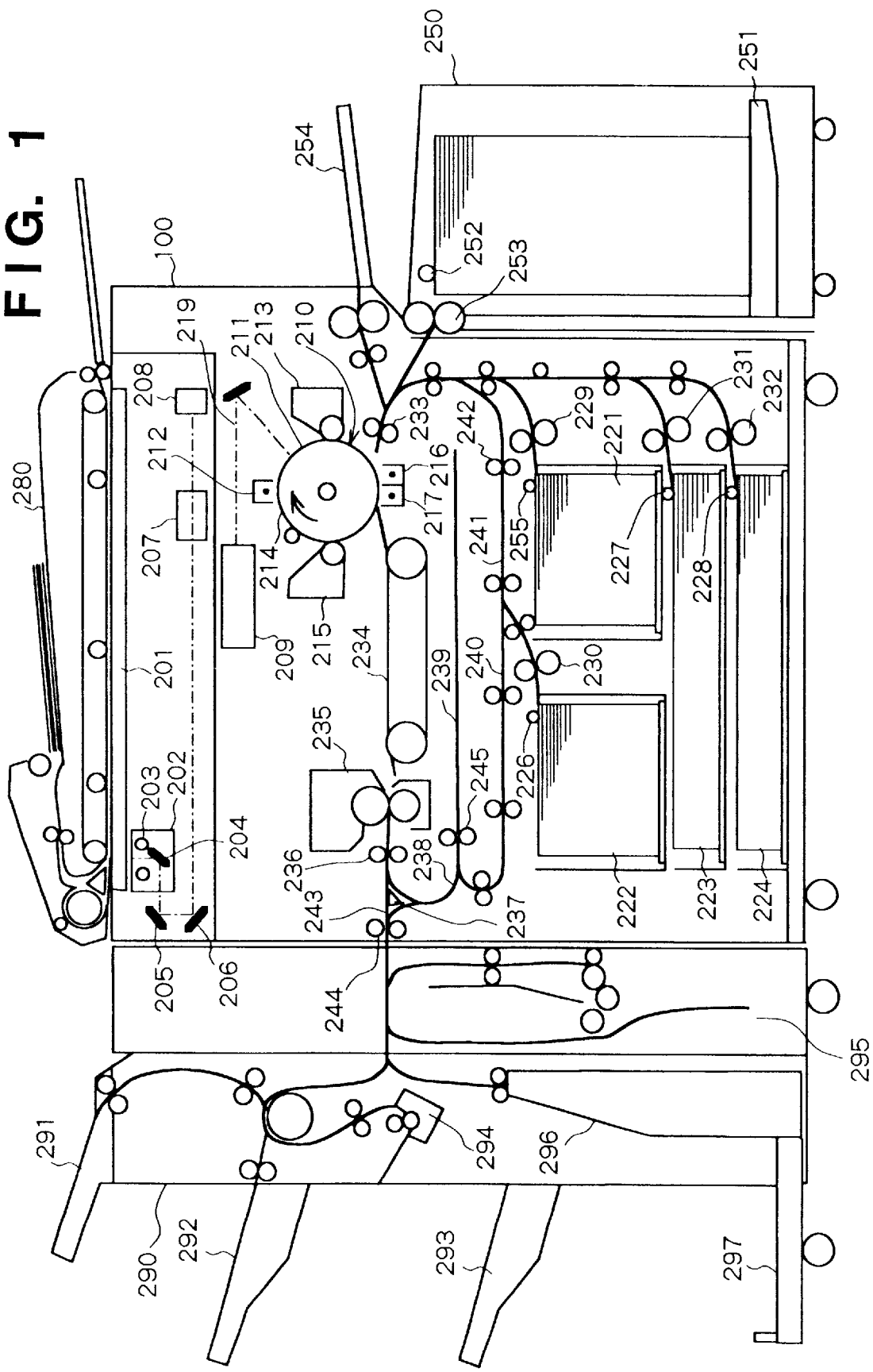
FIG. 1 is a sectional view showing the construction of a digital copier embodying the present invention.

FIG. 1 is a sectional view showing the construction of a digital copier according to one embodiment of the present invention.

As shown in FIG. 1, the digital copier has a main body 100 the upper part of which is provided with an automatic document feeder (DF) 280.

A glass platen 201 serves as a base on which a document is placed. A scanner 202 includes such components as a document illuminating lamp 203 and a scanning mirror 204. The scanner 202 is caused to scan the document back and forth in a predetermined direction by a motor, which is not shown. Light reflected from the document is reflected by scanning mirrors 204–206 and passes through a lens 207 so as to form an image on a CCD sensor within an image sensing unit 208. An exposure controller 209, which includes such components as a laser and a polygon scanner, illuminates a photosensitive drum 211 with laser light 219 that has been modulated based upon an image signal converted to an electric signal and subjected to prescribed image processing by the image sensing unit 208. Disposed about the photosensitive drum 211 are a primary corona discharge device 212, a developing device 213, a transfer corona discharge device 216, a pre-exposure lamp 214 and a cleaning device 215.

In an image processing section 210, the photosensitive drum 211 is rotated by a motor (not shown) in the direction indicated by the arrow. After the photosensitive drum 211 is charged to a desired potential by the primary corona discharge device 212, the drum is irradiated with the laser light 219 from the exposure controller 209, whereby an electrostatic latent image is formed on the drum. The electrostatic latent image that has been formed on the photosensitive drum 211 is developed by the developing device 213 to visualize the image as a toner image.

Transfer paper supplied by a pick-up roller 225, 226, 227 or 228 from a right cassette 221, left cassette 222, upper cassette 223 or lower cassette 224 is sent into the main body of the apparatus by paper feed rollers 229, 230, 231 or 232 and fed to a transfer belt 234 by a registration roller 233 so that visualized toner image is transferred to the transfer paper by the transfer corona discharge device 216. Following transfer of the image, the photosensitive drum 211 has residual toner wiped off by the cleaning device 215 and residual electric charge removed by the pre-exposure lamp 214. The transfer paper to which the image has been transferred is separated from the photosensitive drum 211 by a separating corona discharge device 217 and is then sent to a fixing device 235 by the transfer belt 234. The fixing device 235 fixes the image by applying pressure and heat and then ejects the transfer paper from the main body 100 by discharge rollers 236.

The main body 100 is equipped with a deck 250 capable of accommodating 4000 sheets of transfer paper, by way of example. The deck 250 has a lifter 251 which rises in dependence upon the quantity of transfer paper so that the transfer paper will be made to contact a pick-up roller 252 at all times. The paper is sent into the main body 100 by a paper feed roller 353. The main body 100 is further equipped with a manual insertion tray 254 capable of accommodating 100 sheets of transfer paper.

A paper discharge flapper 237 switches the path between a transport path 238 and a discharge path 243. A lower transport path 240 turns over a sheet of transfer paper, which has been sent from the discharge rollers 236, via a reversal path 239 and then introduces the paper to a paper re-feed path 241. Transfer paper that has been fed from the left cassette deck 222 by paper feed rollers 230 also is introduced to the paper re-feed path 241. Paper re-feed rollers 242 feed the transfer paper to the image processing section 210 again. Discharge rollers 244 are disposed in the vicinity of the paper discharge flapper 237 and eject from the apparatus a sheet of transfer paper that has been switched to the side of the discharge path 243 by the paper discharge flapper 237. When paper is to be printed on both its sides (double-sided copying), the paper discharge flapper 237 is raised to introduce a printed sheet of transfer paper to the paper re-feed path 241 via the transport path 238, reversal path 239 and lower transport path 240. At this time the sheet of transfer paper is completely extracted at its trailing edge from the transport path 238 by the reversal rollers 239 and is pulled into the reversal path 239 up to a position where it is in a state embraced by the reversal rollers 245. By rotating the reversal rollers 245 in the opposite direction, the paper is delivered to the transport path 240. When transfer paper is to be ejected from the main body upon being turned over, the paper discharge flapper 237 is raised and the transfer paper is pulled at its trailing edge into the reversal path 239 by the reversal rollers 245 up to a position where part of the sheet of paper will still remain in the transport path 238. By rotating the reversal rollers 245 in the opposite direction, the paper is turned over and then delivered to the side of the discharge rollers 244.

A discharged-paper handling section 290 has a management tray 294 on which transfer paper ejected from the digital copier 100 one sheet at a time is stacked with its edges aligned. If the forming of images on transfer paper and the discharge of the transfer paper from the apparatus are finished, this stack of the transfer paper is stabled together and discharged onto a paper drop tray 292 or 293 as one sheaf. The paper drop tray 293 is moved up and down by a motor (not shown) and is moved to the position of the management tray 294 before the image processing operation starts. Partitioning paper inserted between sheets of ejected transfer paper is stacked on a paper tray 291. A Z-folder 295 folds an ejected sheet of transfer paper into a Z-shaped configuration. Further, a bookbinding unit 296 performs bookbinding by gathering some ejected sheets of transfer paper together, folding them at the center and then stapling the sheets together. The bound sheath of paper is ejected onto a paper drop tray 297.

<Control of Digital Copier>

Figure 2:
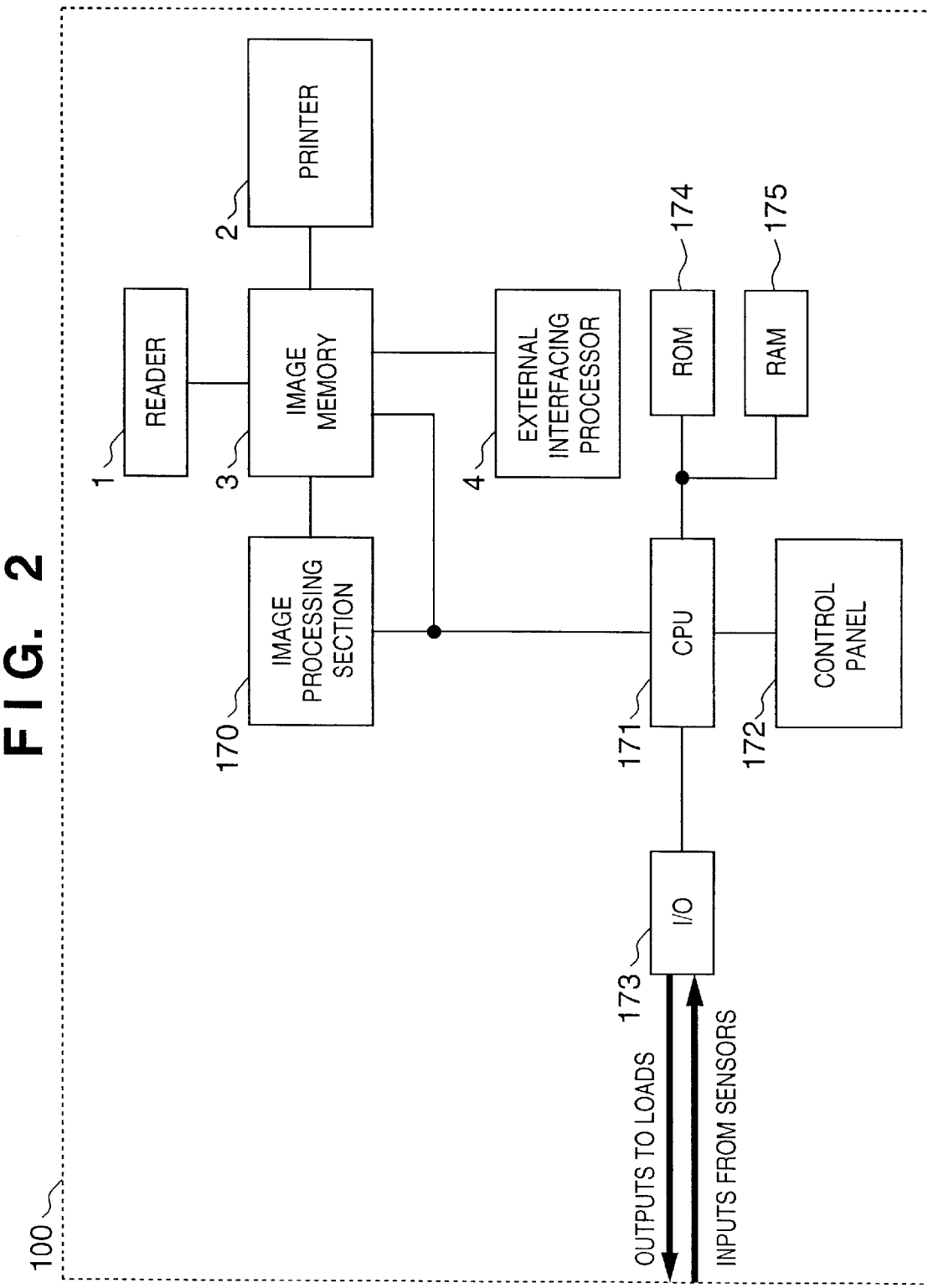
FIG. 2 is a block diagram of digital copier control.

FIG. 2 is block diagram useful in describing control components within the digital copier 100. A CPU 171 carries out basic control of the digital copier 100 and is connected to a ROM 174 to which a control program has been written, a working RAM 175 used for processing, and an input/output port 173 by an address bus and data bus. Various loads (not shown) such as motors and clutches that control the digital copier 100 and inputs from sensors such as a sensor for sensing paper position are connected to the input/output port 173. The CPU 171 executes an image forming operation by performing input/output control in successive fashion via the input/output port 173 in accordance with the content of the ROM 174. A control panel 172 which displays the status of the digital copier 100 is connected to the CPU 171. Also connected to the CPU 171 are the image processing section 210, which processes the electric signal obtained by the conversion in the image sensing unit 109, and an image memory 3, which stores a processed image.

Figure 5:
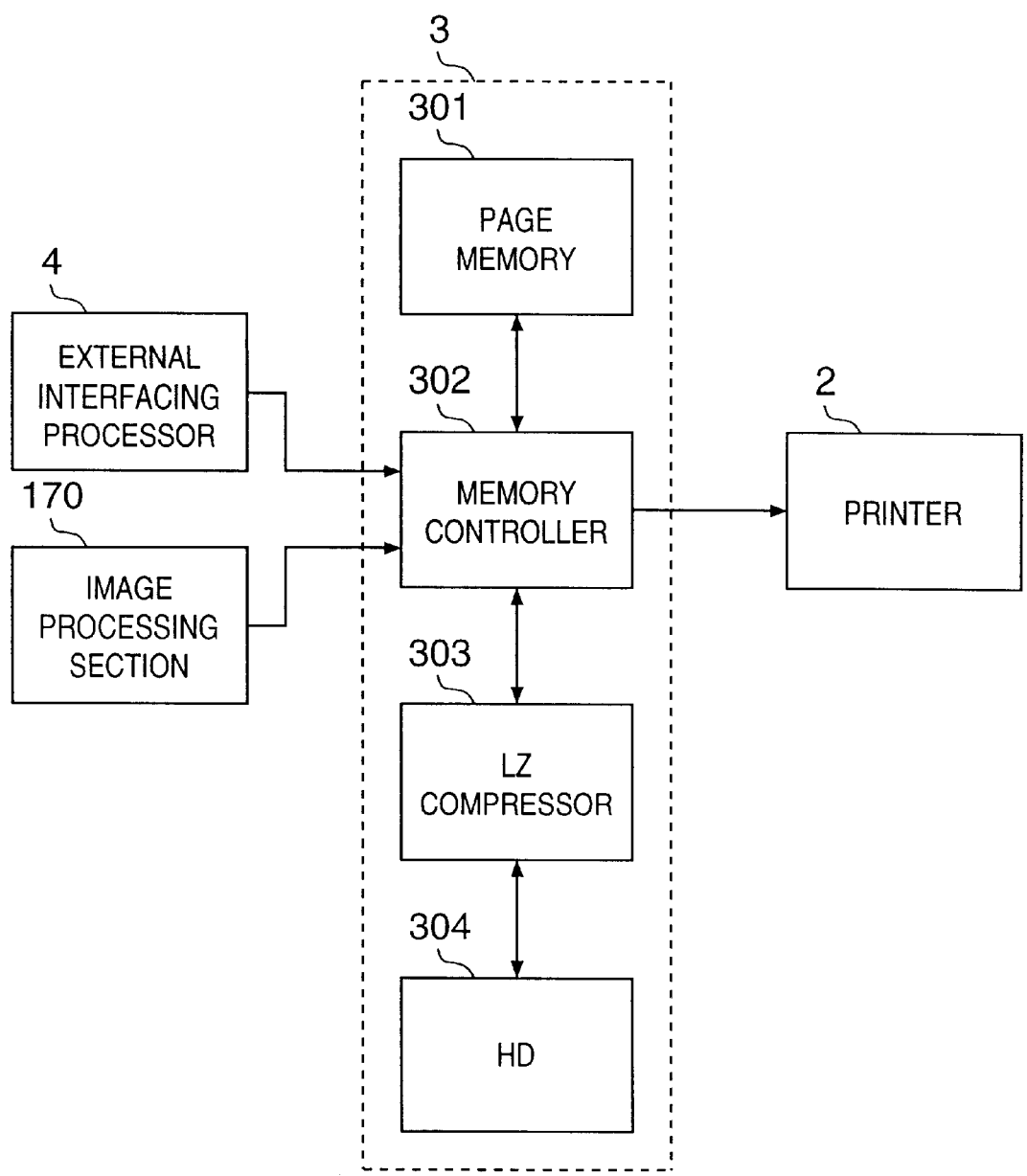
FIG. 5 is a block diagram of an image memory.

The details of the image memory 3 will be described with reference to FIG. 5. The image memory 3 includes a page memory 301 constituted by a memory such as a DRAM, a memory controller 302, and LZ compressor 303 and a hard disk (HD) 304, where serves as a large-capacity storage device. A bilevel image from the image processing section 210 that arrives via an external interfacing (I/F) processor 4 is written to the page memory 301 via the memory controller 302. An image is read out of the page memory 301 and delivered to a printer 2 via the memory controller 302. Access to the hard disk 304 to input and output images also is performed via the memory controller 302. The external interfacing processor 4 expands PDL that has entered from an external computer into a bitmap. The LZ compressor 303 compresses and decompresses image data in accordance with an input to or an output from the hard disk 304.

The memory controller 302 generates a DRAM refresh signal for the page memory 301 and arbitrates access to the page memory 301 from the external interfacing processor 4, image processing section 210 and hard disk 304. In accordance with instructions from the CPU 171, the memory controller 302 controls the address for writing to the page memory 301, the address for reading from the page memory 301 and the direction of read-out. As a result, the CPU 171 controls a function for laying out a plurality of images in the page memory 301 and for outputting the images to the printer 2, a function for extracting part of an image and outputting the same, and a function for rotating images.

<External Interfacing>

Figure 3:
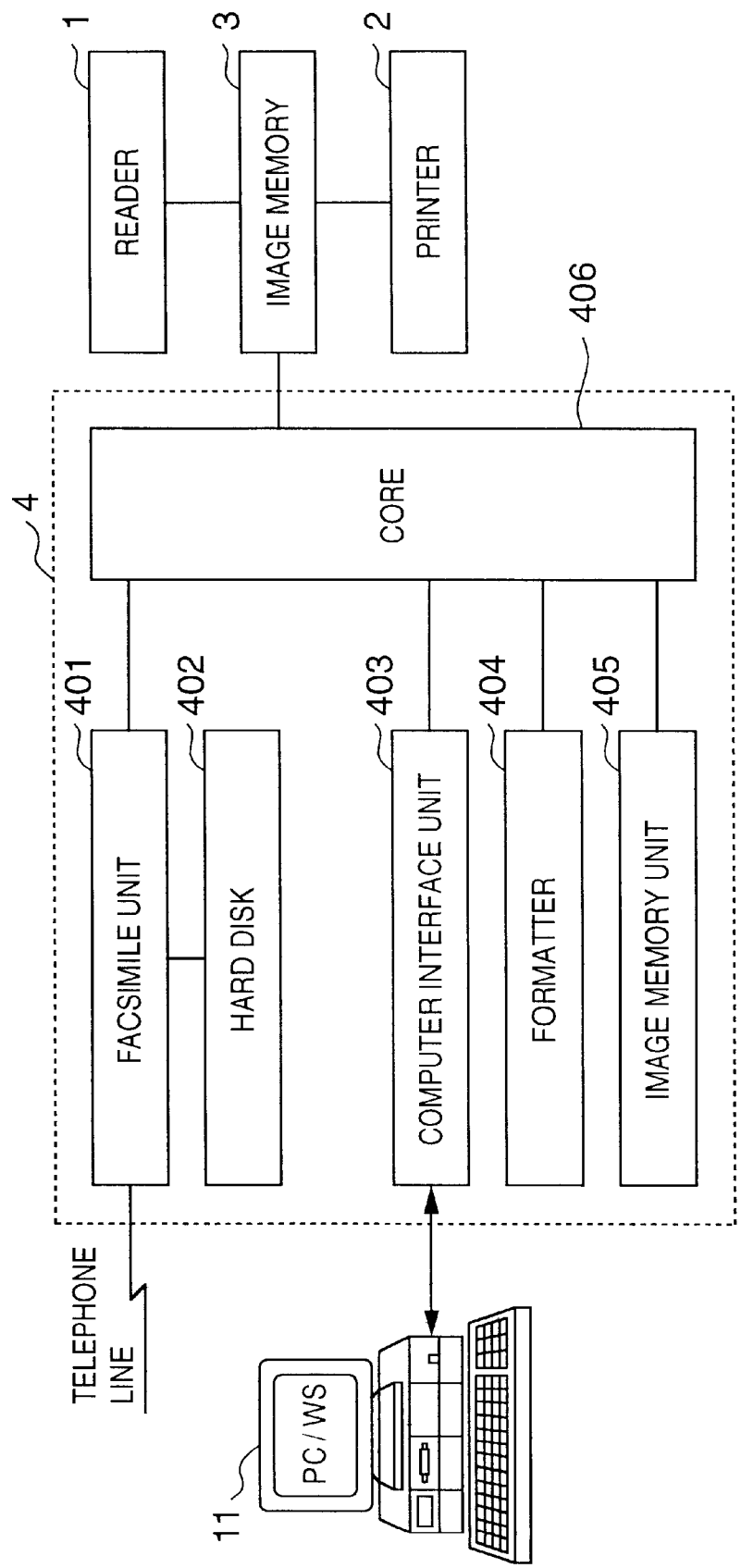
FIG. 3 is a block diagram showing an external interfacing processor.

The construction of the external interfacing processor 4 will be described in accordance with FIG. 3. As mentioned above, bilevel image data from a reader is input to the external interfacing processor 4 via the image memory 3 and bilevel image data from the external interfacing processor 4 is output to the printer 2, whereby an image is formed. The external interfacing processor 4 has a core 406, a facsimile unit 401, a hard disk 402 for preserving image data to be transmitted by the facsimile unit 401, a computer interface unit 403 connected to an external computer 11, a formatter 404 and an image memory unit 405.

The facsimile unit 401, which is connected to a public line via a modem (not shown), receives facsimile communication data from the public line and transmits facsimile communication to the public line. The facsimile unit 401 performs a facsimile function, namely facsimile transmission at a designated time, transmits image data upon requesting a designated password from the communicating party and saves preserves facsimile images in the hard disk 402. As a result, once an image has been transferred from the reader 1 to the facsimile unit 401 and facsimile hard disk 402 via the image memory 3, a facsimile transmission can be performed without using the reader 1 and image memory 3 for the facsimile function.

The computer interface unit 403, which is for performing data communication with the external computer, has a local area network (LAN), a serial interface, an SCSI interface or a Centronics interface for printer data input. The states of the printer and reader are reported to the external computer via this interface and an image read by the reader 1 is transferred to the external computer via this interface in response to instructions from the computer. In addition, print data is received from the external computer via this interface. Print data sent from the external computer via the computer interface unit 403 is described by a special-purpose printer code, the formatter 404 converts this code to raster image data, which is formed into an image by the printer via the image memory 3.

The formatter 404 expands the raster image data using the image memory unit 405. The latter is used by the formatter 404 as a memory for expanding the raster image data. In case of an image scanning function in which an image from the reader 1 is sent to the external computer via the computer interface unit 403, the image data sent from the image memory 3 is expanded in the image memory unit 405 and is then converted to the format of data sent to the external computer. This data is sent from the computer interface unit 403.

The core 406 controls and manages the transfer of data between the image memory 3 and the facsimile unit 401, computer interface unit 403, formatter 404 and image memory unit 405. As a result, even if the external interfacing processor 4 has a plurality of image output units and even if there is only one image transfer path to the image memory 3, images are output while exclusive control and priority control is executed under the management of the core 406.

<Construction of Image Processing Section>

Figure 4:
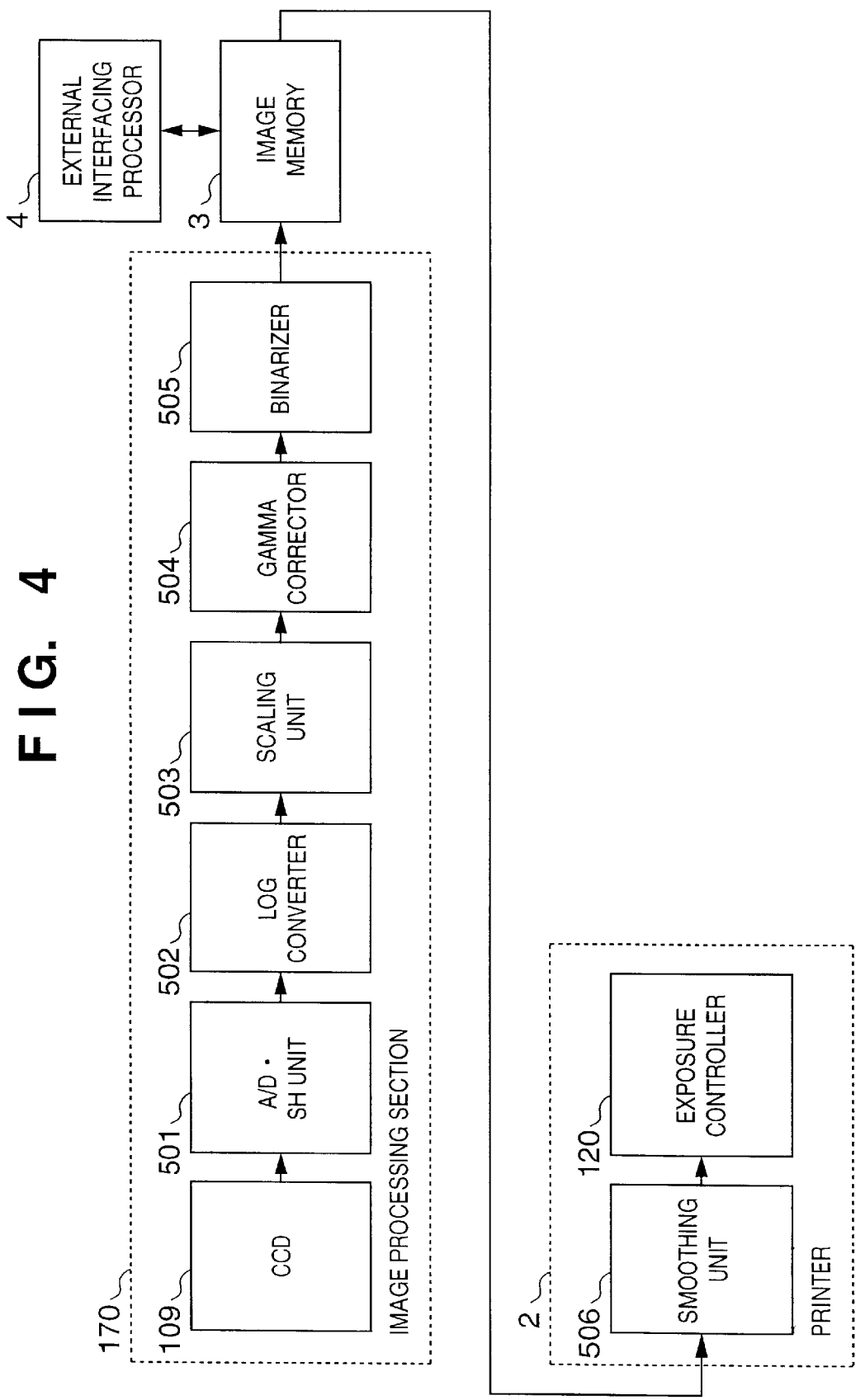
FIG. 4 is a block diagram of an image processing section.

The details of the image processing section 170 will now be described with reference to the block diagram of FIG. 4 illustrating this section.

The image of a document formed on the CCD sensor 109 via a lens 108 enters a black luminance data and is converted to an analog electric signal by the CCD sensor 109. The image information obtained by the conversion is input to an analog signal processor (not shown), where the information is sampled and held and subjected to a dark-level correction, etc. An A/D conversion & shading correction unit (A/D.SH) 501 performs an analog-to-digital conversion and then subjects the digital data to a shading correction (correction of variance exhibited by the sensor that reads the document and correction of the distribution characteristic of the document illuminating lamp). The output signal of the unit 501 is sent to a log converter 502.

The log converter 502, which contains a LUT for converting the entered luminance data to density data, outputs a table value corresponding to the entered data, thereby converting the luminance data to density data. The density data is sent to a scaling processor 503.

The scaling processor 503 scales the input image to obtain a desired magnification and then sends the scaled image data to a gamma corrector 504.

When density data is output, the gamma corrector 504 performs a conversion by a LUT that takes printer characteristics into account and performs an output adjustment that conforms to a density value set by a control panel. The gamma-corrected data is sent to a binarizer 505.

The binarizer 505 binarizes the multilevel density data to two levels and makes the density value of each pixel a "0" or a "1". For example, in the case of image data composed of eight bits per pixel, the density of each pixel is converted to "0" or "255" and is binarized to image data of a signal bit having a value of "0" or "1". As a result, the amount of image data stored in memory is reduced. However, when 8-bit image data per pixel is binarized, the number of tones of the image changes from 256 to two and, as a consequence, image data having many halftones, as in the case of a photographic image, generally experiences pronounced degradation. Accordingly, it is necessary to express pseudo-halftones by bilevel data.

The binarizer 505 uses the error diffusion method as a technique for expressing pseudo-halftones by bilevel data. This method involves performing binarization by adopting "255" as the density value of a pixel of interest if the density of this pixel is greater than a threshold value and "0" as the density value if the density value is less than the threshold value, and distributing the difference between the actual density value of the pixel of interest and its binarized density value as an error to neighboring pixels. The distribution of the error is performed by multiplying a coefficient in a previously provided matrix by the error resulting from binarization and then adding the product to surrounding pixels. As a result, the average values of density of the overall image are preserved and halftones can be expressed artificially by two values.

The binarized image data is sent to and stored in the image memory 3. Since image data from the computer that enters from the external interfacing processor 4 has been processed as bilevel image data by the external interfacing processor 4, this data is sent to the image memory 3 as is.

The image memory 3 has a high-speed page memory and a large-capacity memory (hard disk) capable of storing a plurality of pages of image data. The plural pages of image data stored in the hard disk are output in an order that conforms to an editing mode designated at the control panel of the image forming apparatus 100. If sorting has been designated, for example, the images of a sheaf of documents read from the document feeder 280 are output in order. Temporarily stored image data of a document is read out of the hard disk. This is repeated a plurality of times to output the data. As a result, it is possible to perform a function the same as that of a sorter having a plurality of bins. The image data output by the image memory 3 is sent to a smoothing unit 506 in the printer 2. The smoothing unit 506 performs data interpolation so as to smoothen the leading edge of the binarized image and outputs the resulting image data to an exposure controller 120. The latter forms the image data on transfer paper by the processing described earlier.

<Construction of Image Memory>

The details of the image memory 3 will be described with reference to FIG. 5. The image memory 3 includes a page memory 301 constituted by a memory such as a DRAM, a memory controller 302, and LZ compressor 303 and a hard disk (HD) 304, where serves as a large-capacity storage device. A bilevel image from the image processing section 210 that arrives via an external interfacing (I/F) processor 4 is written to the page memory 301 via the memory controller 302. An image is read out of the page memory 301 and delivered to a printer 2 via the memory controller 302. Access to the hard disk 304 to input and output images also is performed via the memory controller 302. The external interfacing processor 4 expands PDL that has entered from an external computer into a bitmap. The LZ compressor 303 compresses and decompresses image data in accordance with an input to or an output from the hard disk 304.

The memory controller 302 generates a DRAM refresh signal for the page memory 301 and arbitrates access to the page memory 301 from the external interfacing processor 4, image processing section 210 and hard disk 304. In accordance with instructions from the CPU 171, the memory controller 302 controls the address for writing to the page memory 301, the address for reading from the page memory 301 and the direction of read-out. As a result, the CPU 171 controls a function for laying out a plurality of images in the page memory 301 and for outputting the images to the printer 2, a function for extracting part of an image and outputting the same, and a function for rotating images.

<Control Panel of Digital Copier>

Figure 6:
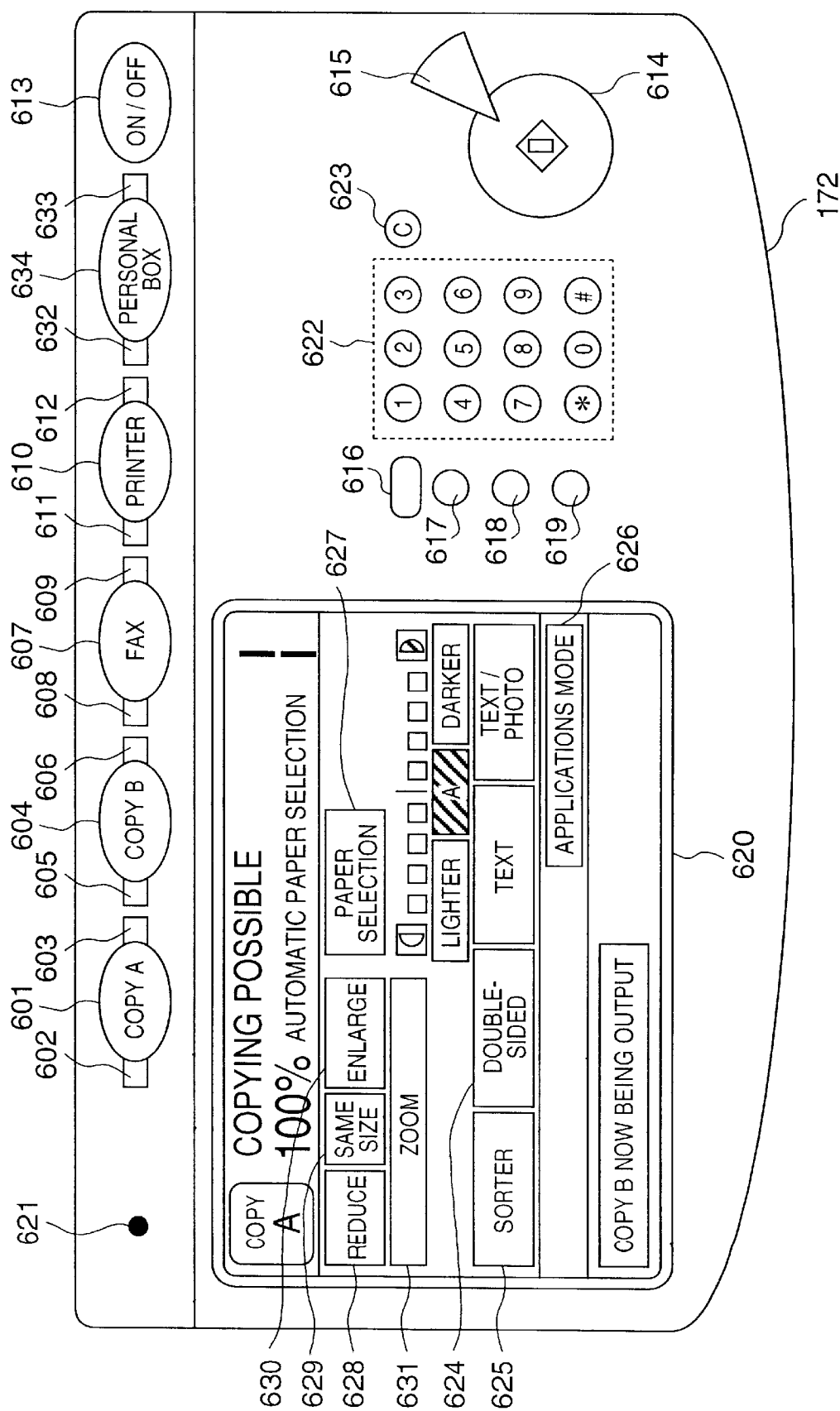
FIG. 6 is a diagram showing a control panel of the digital copier.

A control panel for setting the copying operation of the image forming apparatus set forth in FIG. 1 will be described in accordance with FIG. 6. As shown in FIG. 6, a power lamp 621 indicates that power is being supplied. The power lamp 621 turns on or off depending upon whether the power supply has been switched ON or OFF by a power switch 613. A numeric key pad 622 is used to set the number of images to be formed and to input a numerical value for setting a mode. The numeric key pad 622 is further used to input a telephone number on a facsimile setting screen. A setting that has been made by the numeric key pad 622 is cleared by a clear key 623. A reset key 661 is for restoring a set number of images to be formed, the operating mode or selected paper supply cassette to an already established value. A start key 614 is pressed to start the image forming operation. Provided at the center of the start key 614 are red and green LEDs (not shown) which indicate whether the apparatus can be started or not. The red LED lights if the apparatus cannot be started and the green LED lights if the apparatus can be started. A stop key 615 is used to stop the copying operation.

When a guidance key 617 is pressed and this is followed by pressing another key, an explanation of the function capable of being set by this key is displayed on a display panel 620. To clear the guidance display, the guidance key 617 is pressed again. When a user set key 618 is pressed, it becomes possible for the user to change the setting of the image forming apparatus. Settings that can be changed by the user include how long before a setting will be cleared automatically, the setting of a stipulated value of mode when the reset key is pressed, etc. When an interrupt key 619 is pressed during the image forming operation, other image forming operations are halted and a copy can be made without using the automatic document feeder 180. The display panel 620 is composed of liquid crystal or the like and the displayed content changes in dependence upon the set mode in order to facilitate a detailed mode setting. The surface of the display panel 620 employs touch sensors.

Figure 7:
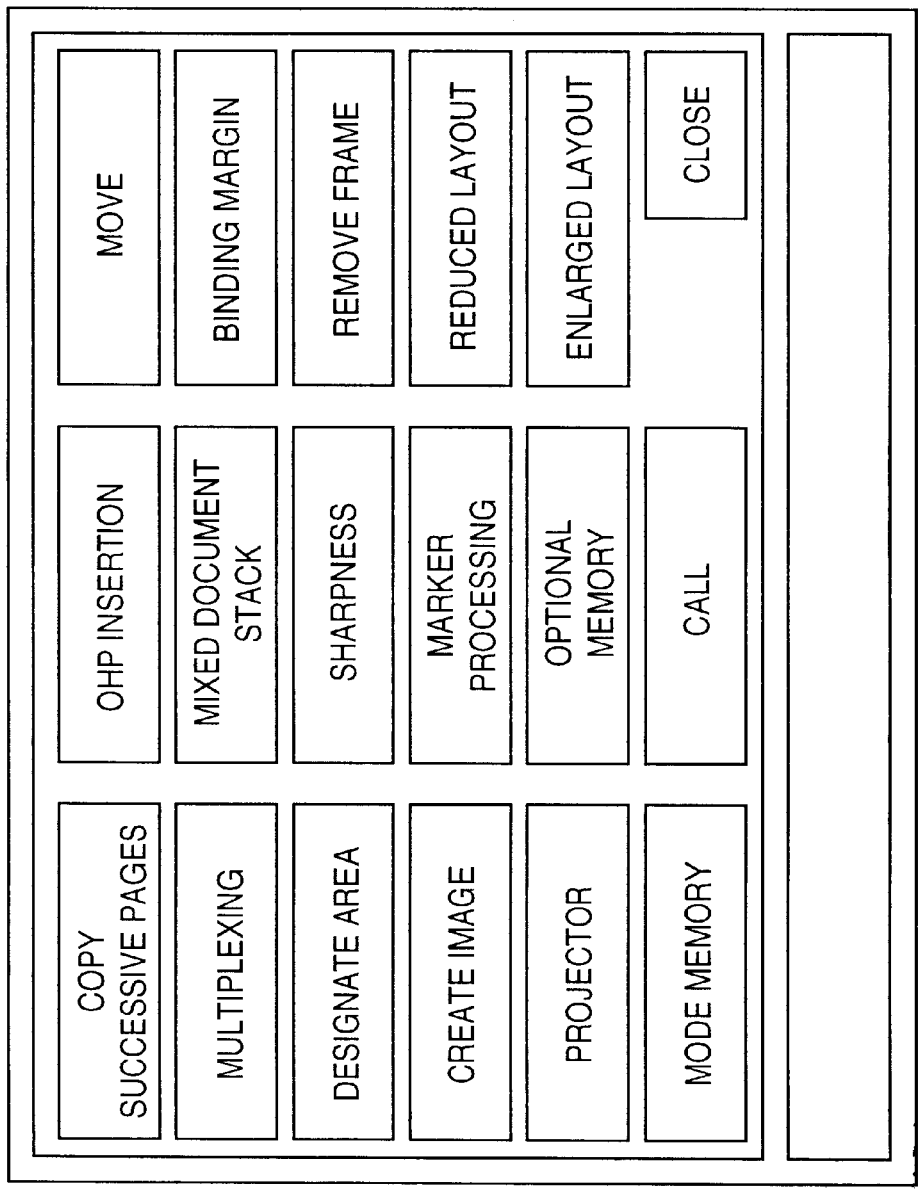
FIG. 7 is a diagram illustrating an example of a screen for setting a copier operation mode of the digital copier.

FIG. 6 shows an example of a screen for setting the copying mode. As shown in FIG. 6, keys 624 to 634 are displayed within the display panel 620. When the position of a displayed key is touched, this is recognized as depression of the key and the corresponding mode is set. The key 627 is a key for selecting the paper cassette. When this key is pressed, the display panel 620 presents a display for setting from which of the cassettes 131, 132 paper is to be supplied. The keys 628 to 634 are keys for setting copying magnification when copying is performed. The key 626 is for setting an applications mode. When this key is pressed, the display panel displays a screen for setting an application function mode such as multiplexing, reduced layout mode or display/- - - mode. For example, the display panel presents a display of keys for setting various application function modes of the kind shown in FIG. 7, thus making it possible to set these modes. The key 624 is for setting double-sided operation. For example, three types of double-side modes can be set, namely a "single-double mode" in which a double-sided output is obtained from single-sided documents, a "double-double mode" in which a double-sided output is obtained from double-sided documents, and a "double-single mode" in which two single-sided sheets are output from double-sided documents. The key 625 is a sorting key which, by being pressed, sets the operating mode of a paper discharge processor 190 or sets a mode for sorting output sheets of paper using the image memory. When a mode corresponding to a displayed key within the display panel cannot be set, the fact that this key cannot be operated is indicated by causing the key to appear shaded.

The set content of the copying operation and the current operating state are displayed on the display panel 620. Provided at the upper left of the screen of the display panel 620 is an indication as to which screen of various function modes, described later, the present screen corresponds. In the example of FIG. 6, the present screen is a screen for setting a copy A. Though this is expressed by characters in the example of FIG. 6, symbols may be used instead. The bottom of the display panel 620 has an area in which the operating state of another function mode, described later, can be indicated by single line. In the example of FIG. 6, this area indicates a copy B is currently being output to the printer. A key that can be changed by the user is provided alongside the applications mode key 626 in the display panel 620. It is possible to register up to a maximum of two function keys capable of being set on the applications mode setting screen. By displaying the applications mode setting key at the illustrated position, the setting of the registered mode can be carried out with ease. These keys shall be referred to generically as "preferred function keys".

FIG. 8A shows a screen for setting the item of a preferred function key 1. This screen is displayed by pressing the user set key 618 and then selecting the setting of the preferred function key 1 at the setting item. By selecting an item on the screen shown in FIG. 8A and then pressing the "OK" key, keys of functions displayed by the preferred function key can be selected. New keys are displayed on the screen as shown in the example of FIG. 8B.

Reference numerals 601–612 and 631 in FIG. 6 denote keys and LED displays for changing over the display on the control panel in order to set the functions of a copying operation and system operation that use the image forming apparatus 100. Keys 601, 604, 607, 610, 631 are for changing over functions. These keys are semitransparent key buttons and provided within each key is an indicator lamp (not shown) such as an LED. When one of these keys is pressed to select the operating screen, the lamp inside the key lights. Among the lamps within these keys, only the lamp inside the key of the selected operating function screen lights; the lamps inside the other keys are extinguished.

Green LEDs 603, 606, 609, 612, 631 are disposed to the right of these keys. These LEDs indicate that the corresponding functions are active. For example, the LED 606 of copy B is extinguished while copy B is standing by. In a case where copy B is currently being output, as shown in the example of FIG. 6, the LED 606 is caused to flash. In a case where the image of copy B has been saved on the hard disk 304 of the image memory but copy B is not being printed, the LED 606 is extinguished. Similarly, LED 609, which is for a facsimile operation, is caused to flash during a communication, during printing and during read-in. If a facsimile image has been stored on the hard disk 402 of the facsimile unit, then the LED 609 is lit.

Red LEDs 602, 605, 608, 611, 632 are disposed to the left of these keys. These LEDs indicate that the corresponding functions have developed an abnormality. For example, the LED 605 of copy B is made to flash at occurrence of an abnormality such as interruption of operation caused by lack of paper or jamming in regard to copy B. By pressing the copy B function key 604 at this time to change over the display of the control panel to copy B, the status of copy B is displayed on the display panel so that the details of the abnormality can be checked.

These function changeover keys can be pressed at any time regardless of the operating states of the functions, thus making it possible to change over the control panel. In a case where it is possible to switch between the copy A function and the copy B function, as in this embodiment, the operation of keys other than those within the display panel, such as the stop key, start key and reset key, described later, act in regard to the function that has been selected by function changeover keys 601, 604. For instance, in the example of FIG. 6, even if the stop key is pressed when the copy A control screen is being displayed, a copying operation in regard to output of the copy B cannot be halted. In a case where the copying of copy B is to be stopped, the copy B function key 604 is pressed and then the stop key 615, thereby stopping the output of copy B. Data that has been set by the user set key 618 has data on each of the screens selected by the control panels of copies A and B and can be set independently on the respective screen.

<Personal Box>

A personal box, which is a characterizing feature of the present invention, will be described with reference to FIG. 9. A temporary area 900 and a personal box area 901 have been allocated to the hard disk 304. The temporary area 900 is for storing image data temporarily. The data in this area is erased at the conclusion of a job. The personal box area 901 is subdivided into areas uniquely identified by personal box numbers. In a case where a personal box is utilized, PDL image data that has been received from a host 1000 is expanded into bitmap image data by the external interfacing processor. The bitmap image data is stored in the personal box area that corresponds to the personal box number specified by the host. By performing a prescribed operation at the control panel 172, the user can print the image data stored in the personal box area corresponding to his or her own personal box number. Also stored in the personal box area 901 to accompany the stored image data are printing modes for when printing is performed. Print data to be printed and the printing mode which indicates how this image data is to be printed shall be referred to collectively as a "print job" below. There will also be cases where a print job is referred to simply as a "job" hereinafter.

Figure 9:
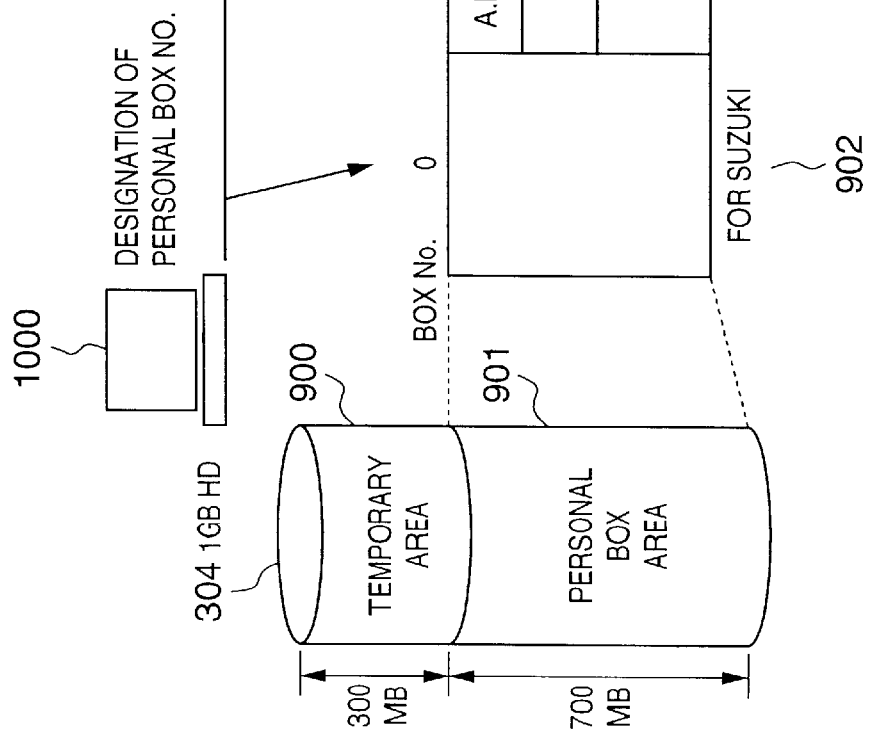
FIG. 9 is a diagram useful in describing a personal box.

In the example of FIG. 9, a 1-GB hard disk is used and the hard disk is divided into 30-MB temporary area and a 700-MB personal box area. In FIG. 9, the personal box area is divided into 10 personal boxes the size of each area of which is 70 MB.

Each personal box has a number. For example, boxes 902, 903, 904, 905 have box numbers 0, 1, 2, 9, respectively. Box 1 is for a user named Tanaka. If Tanaka wishes to enter a PDL document from the host 1000 into his own personal box, he uses the host 1000 to designate Box No. 1 and transmits the PDL data of the document to the digital copier. Further, if Tanaka wishes to enter his own PDL document from the host into the personal box of another individual, e.g., a user named Kato, he uses the host 1000 to designate the box number of the party to which the document is desired to be sent and then transmits the PDL data to this box. If this party is "Kato", Tanaka designates Box No. 9. As a result, Tanaka's own PDL document can be mailed to the box of another person.

<Printing from Personal Box>

Figure 10:
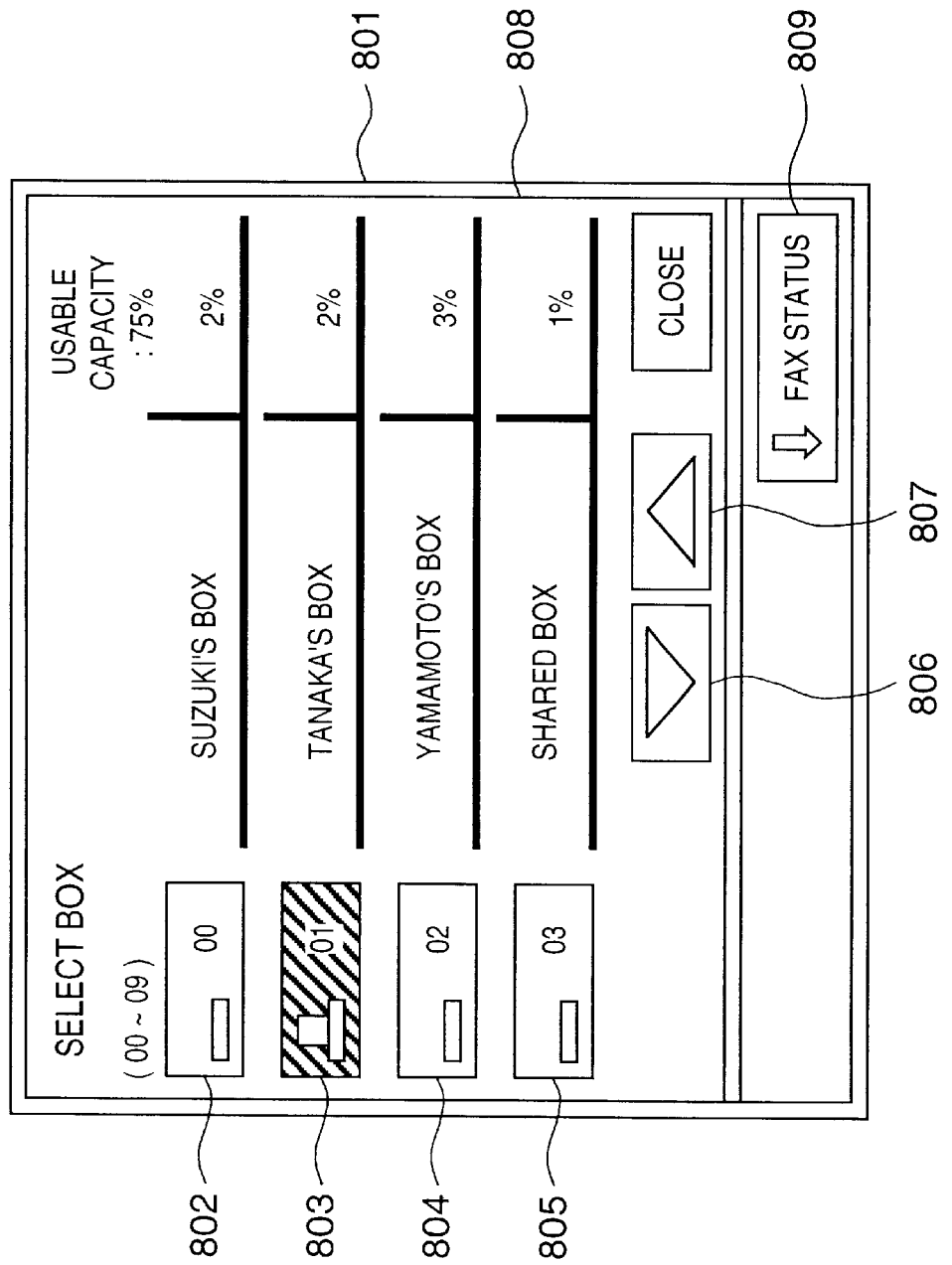
FIG. 10 is a diagram showing a basic display of personal boxes on a display unit.

FIG. 10 shows a personal-box main screen 801 on the control panel 172 of the digital copier 100. The main screen 801 is displayed when a personal box key 634 on the control panel 172 is pressed. As shown in FIG. 10, ten personal boxes having numbers 00 to 09 are provided. Owing limitations upon the display area in FIG. 10, however, information relating to four personal boxes is displayed simultaneously. PDL data from the host is expanded into a raster image for each page and is saved in this form in the personal box that corresponds to the designated number. Names can be assigned to respective personal box numbers on a screen, which is not shown. For example, the name "Tanaka's Box" is assigned to Box No. 1 to clearly show that this box is one used by a person named Tanaka. Further, a percentage display presented farthest to the right of each box indicates what percentage of the hard disk capacity for all personal box areas is occupied by the box. For example, if the hard disk capacity for the personal box areas is 700 MB, then Box No. 0 is currently using about 14 MB if its percentage is 2%.

A button 802 is for viewing a job that has been saved at Box No. 00. Similarly, buttons 803, 804 and 805 are buttons for viewing jobs that have been saved at Box Nos. 01, 02 and 03, respectively. For example, assume that document data created by an application has been transferred by the user Tanaka from the host to Box No. 1, which is his own box, in order to save the data in this box. By subsequently pressing the button 803 of Tanaka's Box No. 1 in the personal box screen 801 displayed on the control panel of the digital copier, a print mode screen for when the document stored in this box is printed will be displayed.

By pressing up/down scroll keys 806, 807, the screen can be scrolled so that it is possible to view the names of the Box Nos. 00–09 as well as the percentages of storage capacity used. A button 808 is for closing the display window. Pressing this button restores the main screen of FIG. 6. A button 809 is a facsimile status button. Pressing this button makes it possible to check the status of facsimile transmission and reception.

<Registration of New Personal Box>

Maintenance of personal boxes will now be described in accordance with FIGS. 11 to 19.

Figure 11:
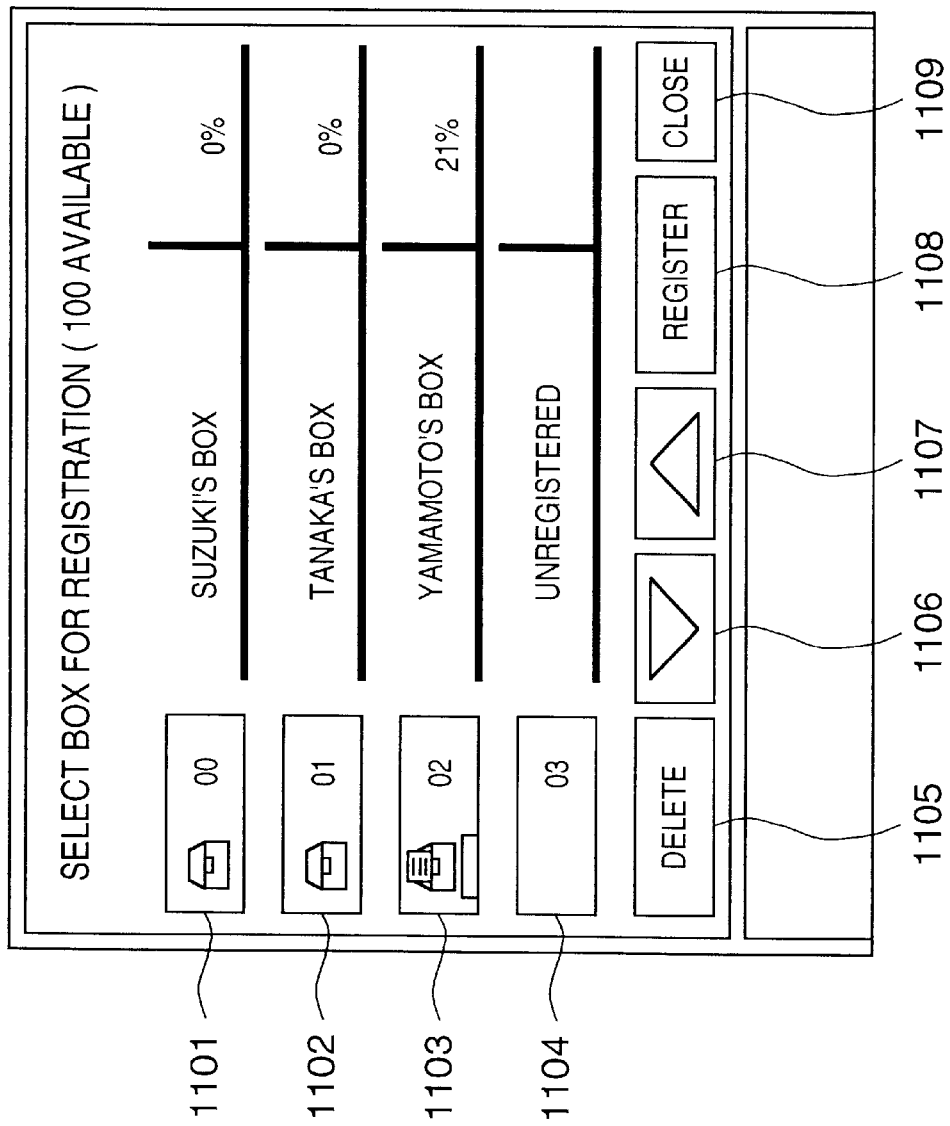
FIG. 11 is a diagram showing a basic screen for registration of personal boxes on the display unit.

FIG. 11 shows a basic screen for registering personal boxes. This screen is displayed by selecting personal box registration from a user mode or the like, which is not shown. Selection buttons 1101–1104 are pressed when the respective personal boxes are to be selected. Keys 1106, 1107 are page-up and page-down keys, respectively. Pressing the key 1106 scrolls the screen down and pressing the key 1107 scrolls the screen up. When the close key 1109 is pressed, a screen such as the user mode screen is restored.

Figure 17:
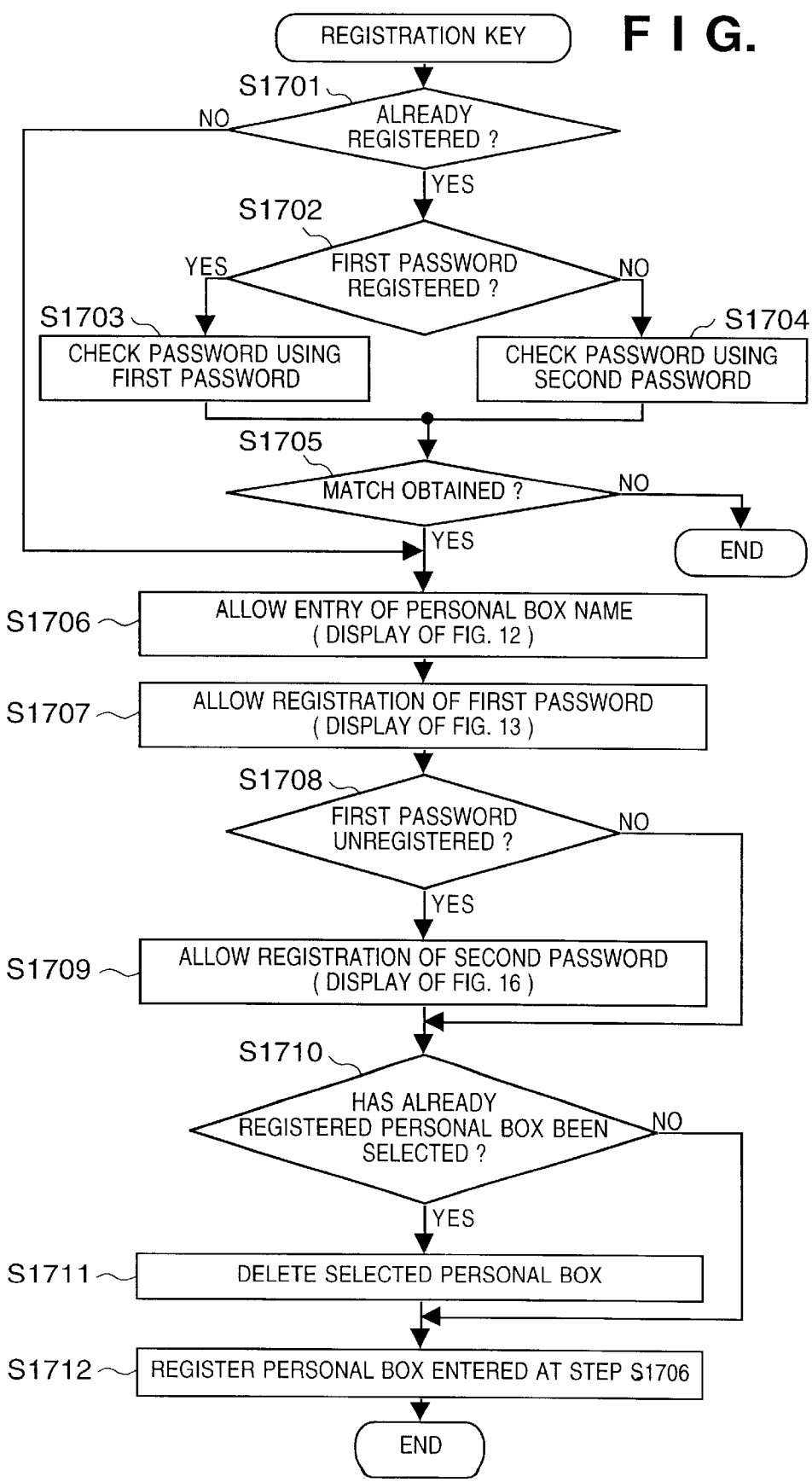
FIG. 17 is a flowchart showing a processing procedure for registering a personal box.

By using the screen shown in FIG. 11 to select an unregistered personal box and then pressing a register button, a transition is made to a screen (FIG. 12) for registering a new personal box. A procedure for registering a new personal box is then executed. FIG. 17 illustrates a flowchart of a procedure in a case where the register key has been pressed. The procedure of this flowchart is implemented by executing a program, which has been stored in the ROM 174 or RAM 175, by the CPU 171. This program may be a program stored as a program file in a file memory of a floppy disk or magneto-optic disk (not shown), etc., and loaded from this memory to the RAM. The same holds true for flowcharts shown in FIGS. 18 and 19, described later.

In FIG. 17, it is determined at step S1701 whether a selected personal box has already been registered. In case of new registration, the box will not yet have been registered and therefore control proceeds to step S1706. Here the screen shown in FIG. 12 is displayed and the user is allowed to enter the name of the personal box.

Figure 12:
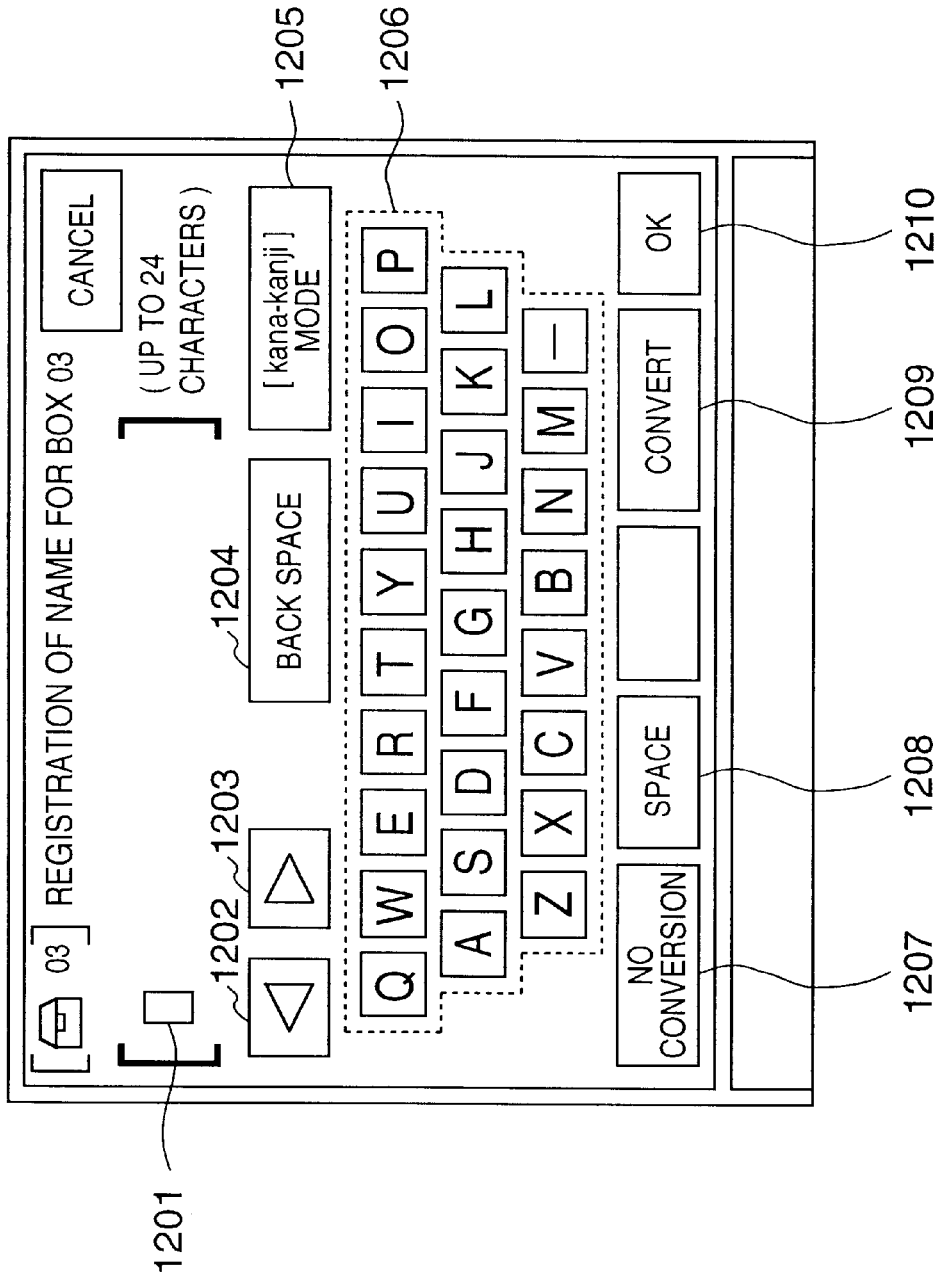
FIG. 12 is a diagram showing a basic screen for registering the name of a personal box on the display unit.

On the name input screen shown in FIG. 12, characters are displayed by pressing alphabetic keys 1206 displayed on the display unit. These keys are used to enter the name of the personal box. The entered name is displayed in a display field 1201. When the entry is made, pressing a "kana-kanji" key 1205 causes a changeover between a hiragana display mode and a Roman alphabet display mode. Pressing a back-space key 1204 makes it possible to delete one character to the left of a cursor. The cursor can be moved by cursor keys 1202, 1203, and a space can be inserted by a space key 1208. If a no-conversion key 1207 is pressed when a hiragana display is in effect, hiragana is converted to katakana or the like without a conversion to kanji. If a conversion key 1209 is pressed when the hiragana display is in effect, hiragana is converted to kanji. Entry of the name is finalized by pressing an "OK" button 1210. The basic screen (FIG. 11) for personal box registration is restored by pressing a cancel button.

When the entry of the name is completed, a screen (FIG. 13) for setting a secret number is displayed and the user is allowed to enter a first password at step S1707.

At step S1707, the user enters a six-digit number, for example, by numeric keys on the display panel and then presses an "OK" button 1302, thereby registering a first password for the newly registered personal box. The registered password is checked when a file in this personal box is to be printed and when this personal box is to be deleted. When the user does not wish to register a first password, the user presses the "OK" button 1302 without entering a number. In this case a password will not be registered for the newly registered personal box. When image data that has been preserved in this personal box is to be printed, therefore, the image data can be printed without entry of a password. If a cancel button 1301 is pressed on this screen, control returns to step S1706 (the screen of FIG. 12 is restored).

It should be noted that the first password is stored in a password area, and each personal box area on the hard disk is provided with such a password area. Alternatively, a password may be stored on the hard disk as a password file associated with a personal box. Though the foregoing holds true also for a second password, which is described later, the first and second passwords are stored in different areas.

Furthermore, in order to make it difficult to read out these passwords, they may be stored upon being encoded.

Figure 13:
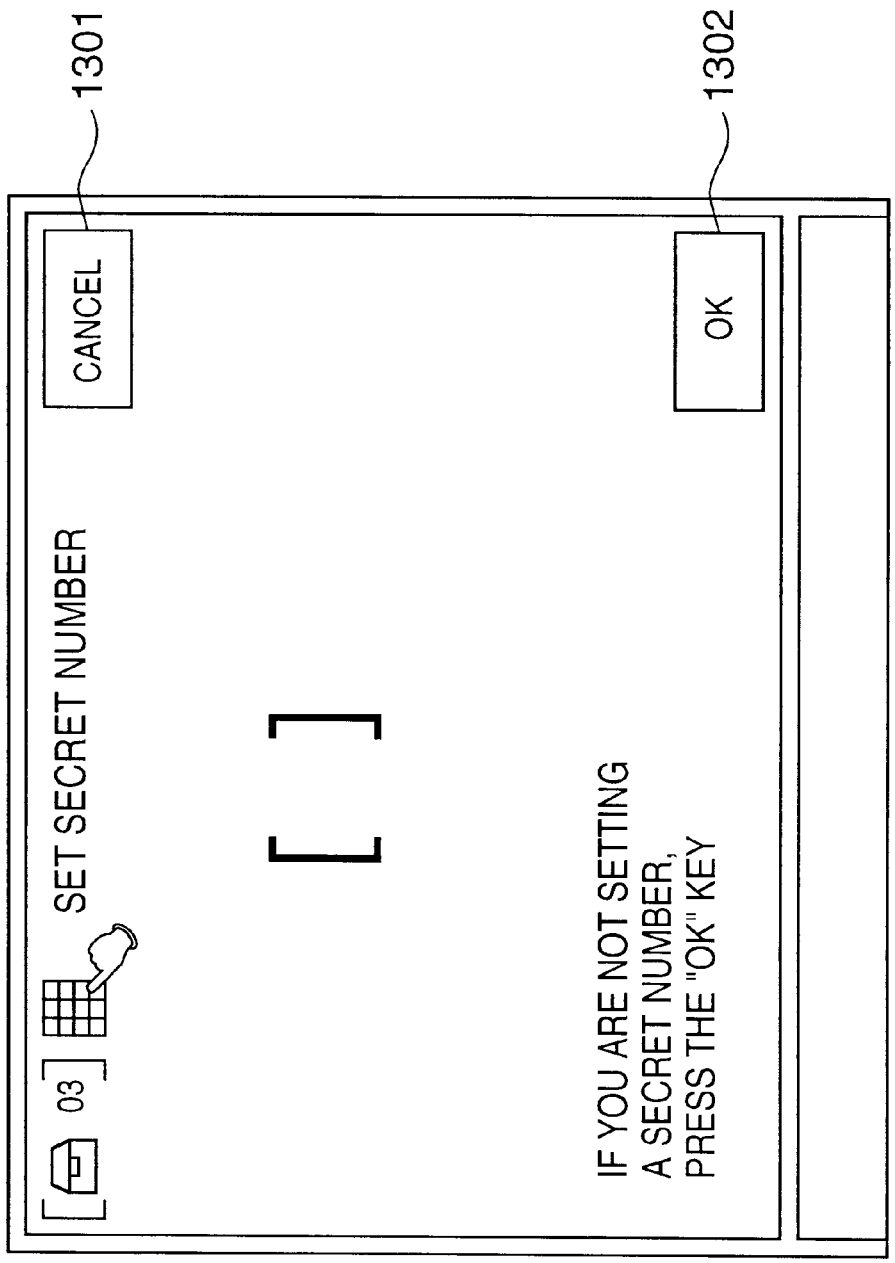
FIG. 13 is a diagram showing a screen for registering a password for a personal box on the display unit.
Figure 16:
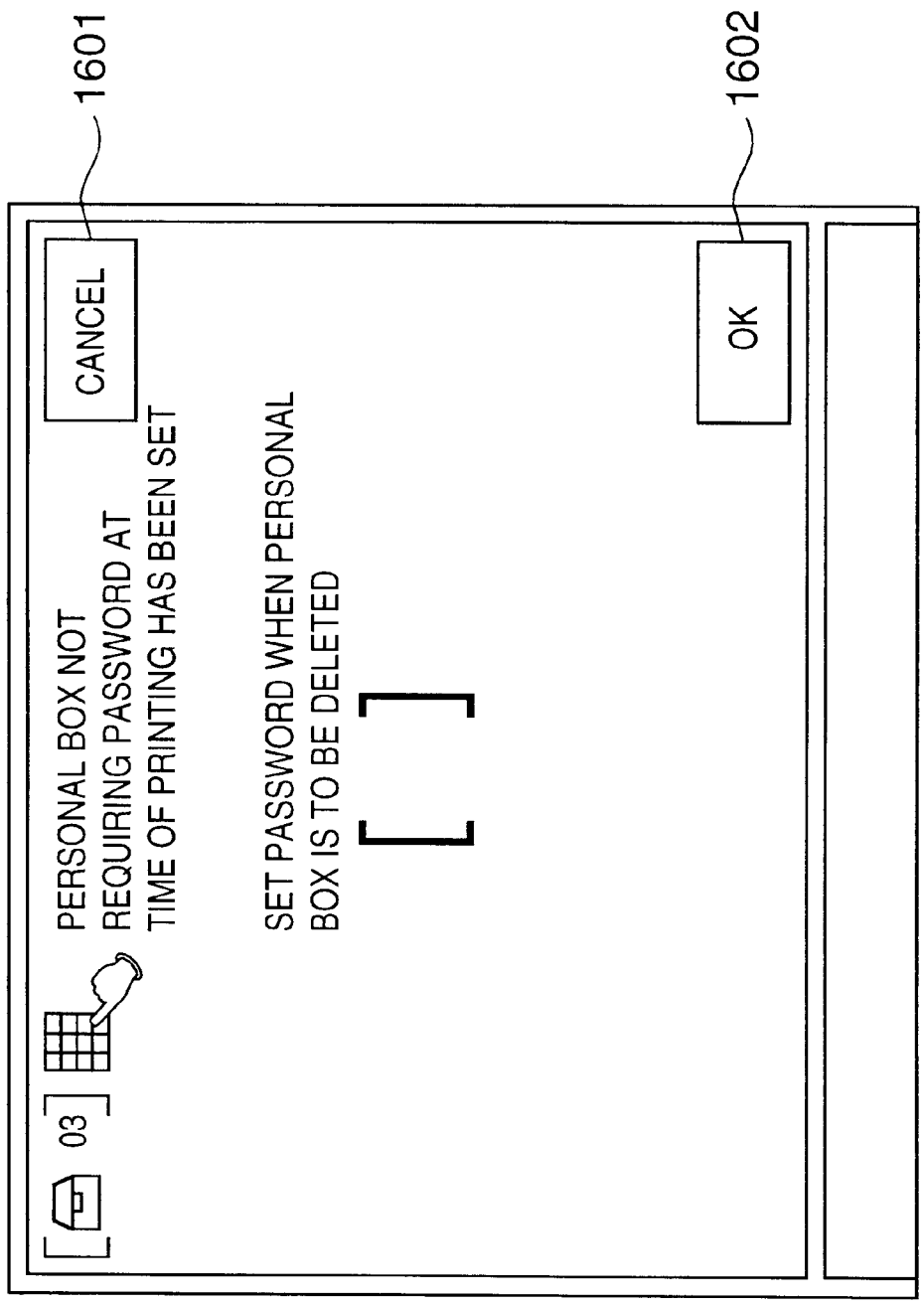
FIG. 16 is a diagram showing a screen for registering a password for deletion of a personal box.

When entry of the first password is finished, it is determined at step S1708 whether the first password is unregistered. If the first password is unregistered, i.e., if the "OK" button was pressed without entering a first password, the screen shown in FIG. 16 is displayed and the user is allowed to register a second password. The second password is a password checked when a personal box is to be deleted, etc. Like the first password, the second password is registered by inputting, e.g., a six-digit number using numeric keys on the control panel and then pressing an "OK" button. In a case where a cancel button is pressed, control returns to step S1707 and the screen of FIG. 13 is displayed.

When the name and passwords have been entered, it is determined at step S1710 whether an already registered personal box has been selected. Since this is a new registration operation, what will have been selected is the "unregistered" field and an already registered personal box will not have been selected. At step S1712, therefore, an area for a new personal box is acquired on the hard disk 304 and the entered name and first and second passwords are registered to correspond to this personal box.

<Deletion and Registration of Personal Box>

In a case where an already registered personal box is selected and the register button is pressed, the selected personal box is erased and is re-registered anew. In this case password entry is requested. The procedure of FIG. 17 is executed in this case as well in order for the register key to be pressed.

It is determined at step S1701 whether an already registered personal box has been selected. Since an already registered personal box has been selected in this case, control proceeds to step S1702, where it is determined whether the first password is unregistered. If the first password has been registered, the user is requested to enter the password at step S1703 and this password is compared with the first password. If the first password is unregistered, then the password that has been entered is compared with the second password.

If the entered password is found to match the registered first or second password at step S1705, then control proceeds to step S1706.

Subsequent processing is substantially similar to the procedure for new registration described above. At step S1710, however, now it is judged that an already registered personal box has been selected, and therefore step S1711 is executed. Here the already registered personal box that has been selected, namely the personal box corresponding to the password compared at step S1703 or S1204, is deleted.

<Deletion of Personal Box>

Figure 19:
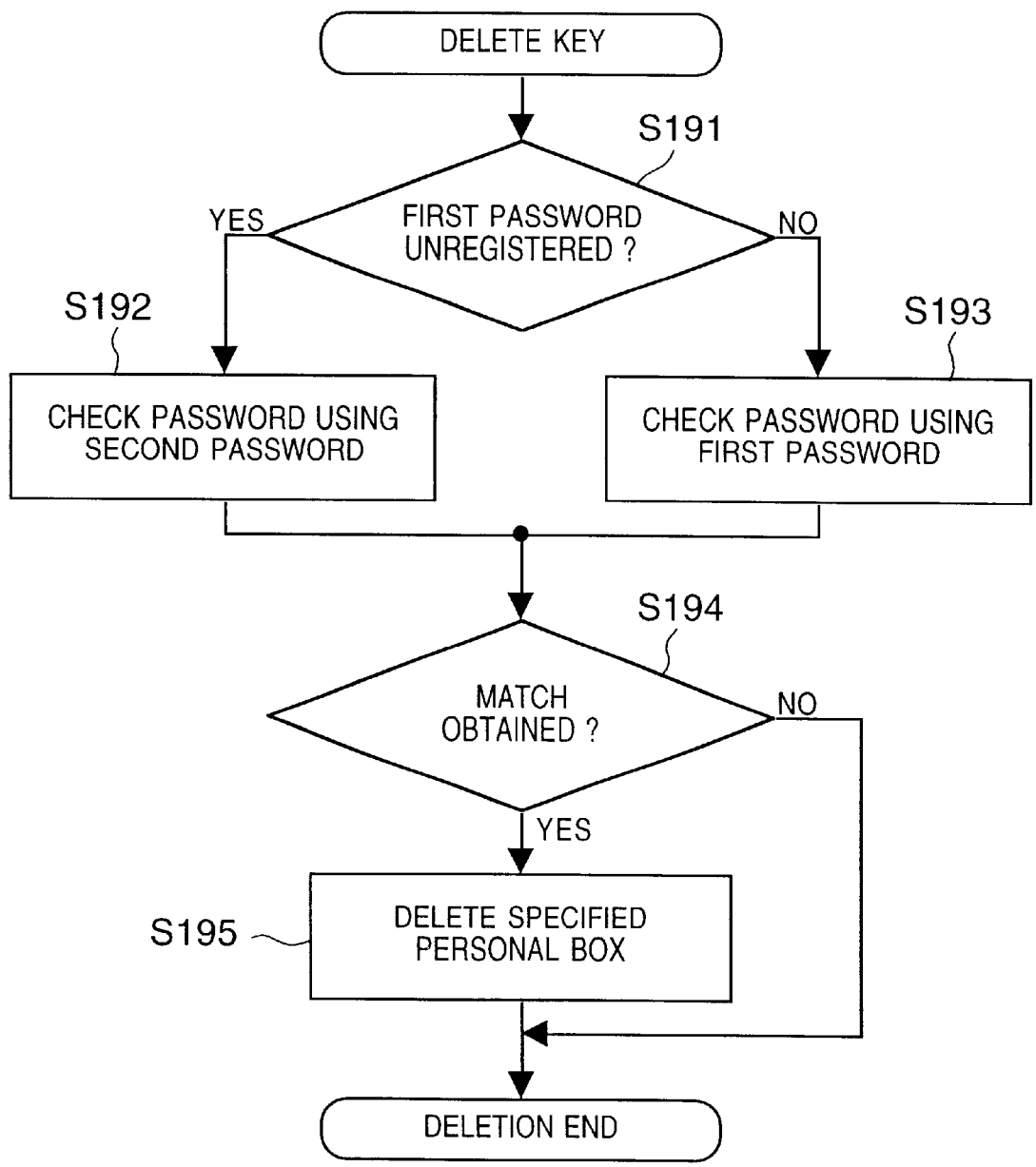
FIG. 19 is a flowchart showing a processing procedure for deleting a personal box.

If a delete key 1105 is pressed, a mode for deleting a selected personal box is established. FIG. 19 is a flowchart showing a processing procedure for deleting a personal box.

As shown in FIG. 19, it is determined at step S191 whether the first password is unregistered. If the first password has been registered ("NO" at step S191), then the operator is requested to enter a password and this is compared with the first password at step S193. If the first password is unregistered ("YES" at step S191), then the entered password is compared with the second password at step S192.

It is determined at step S194 whether the entered password matches the registered first or second password. Control proceeds to step S195 if a match is obtained. A registered personal box that has been selected, namely the personal box corresponding to the password queried at step S192 or S193, is deleted. More specifically, the area of the personal box (FIG. 9) to be deleted is freed and the name and password of the personal box that have been registered in association therewith are deleted.

<Printing of Document in Personal Box>

Figure 18:
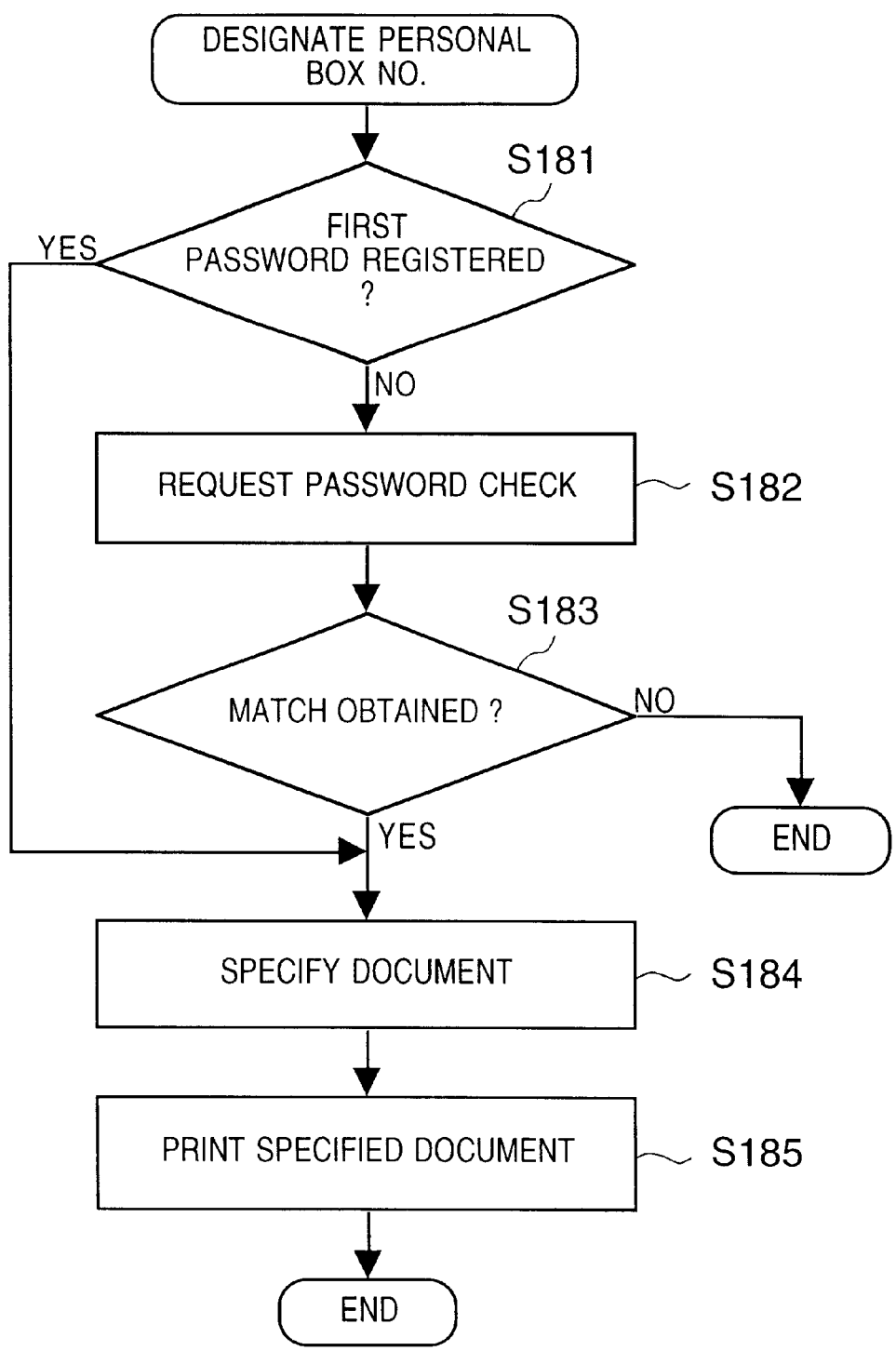
FIG. 18 is a flowchart showing a procedure for printing a document from a personal box.

FIG. 18 is a flowchart of a printing procedure which starts from the moment the number of a personal box to be accessed is specified.

As shown in FIG. 18, it is determined at step S181 whether the first password is unregistered. If the first password has been registered ("NO" at step S181), then the display of FIG. 14 is displayed, the operator is allowed to enter a password and this is compared with the registered first password at step S182.

Figure 14:
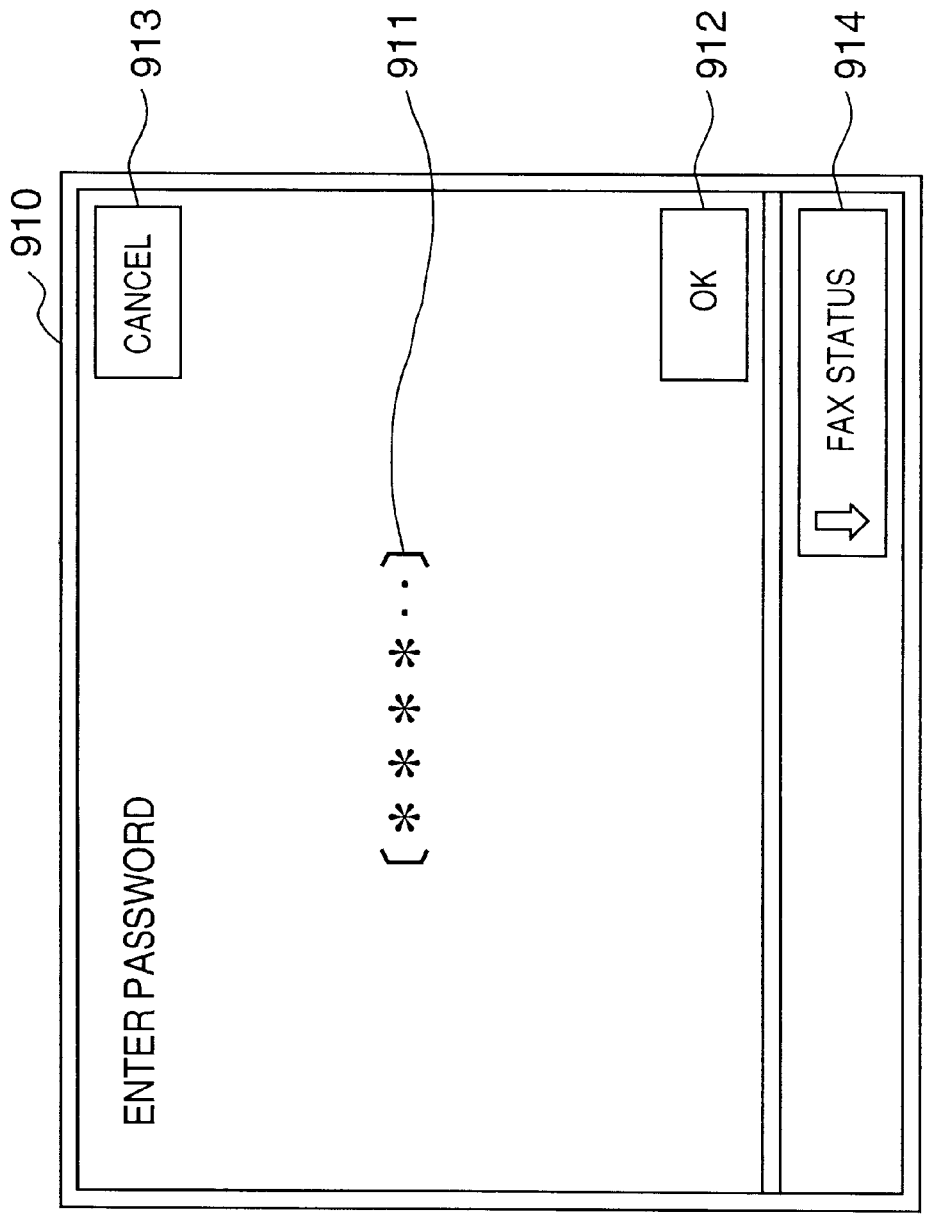
FIG. 14 is a diagram showing a password input screen.

FIG. 14 is a diagram showing a password input screen on the control panel. A screen 910 is for entering a personal box password. The screen 910 allows the operator to enter a six-digit numerical value, for example, as a first password. In order to prevent the entered numerical value from being seen by others, entered digits are displayed in the form of asterisk (*) marks in a display field 911, and digits not yet entered are displayed in the form of dot (.) marks. A key 912 is an "OK" key that is pressed to start interrogation of the entered password. A cancel key 913 is pressed to cancel the password entry and restore the screen 801.

It is determined at step S183 whether the entered password matches the first password. If they do not match, processing is terminated at this time and the operator is not allowed access to the personal box.

If the two passwords match, however, or if it determined at step S181 that the first password is unregistered, then the document to be printed is specified at step S184.

Figure 15:
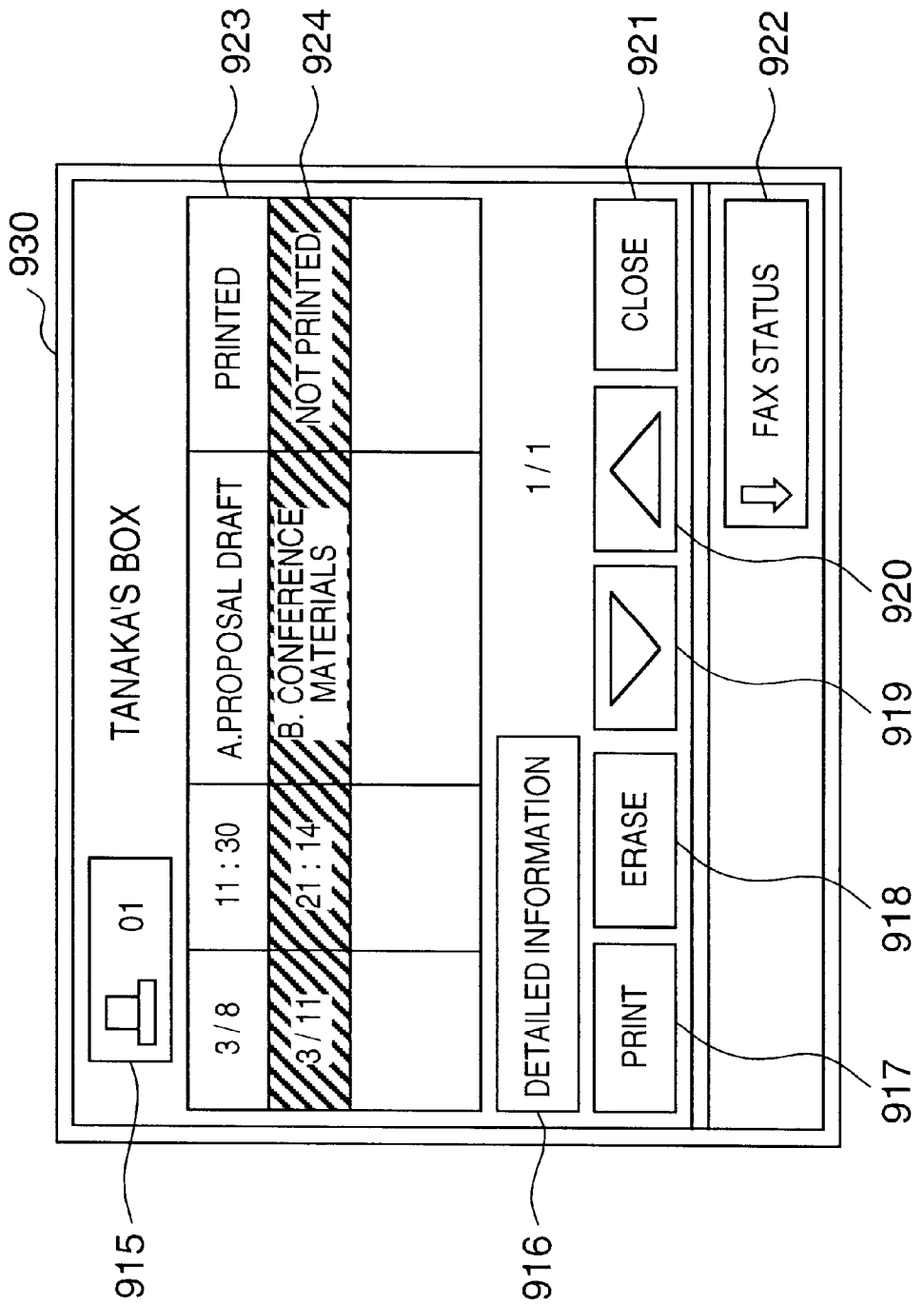
FIG. 15 is a diagram showing an example of a display of an individual personal box.

FIG. 15 shows a screen which displays document data that has been saved in one personal box.

A screen 930 displays document data that has been saved in the personal box of a certain individual. Fields 923 and 924 indicate the documents and their attributes stored in this personal box. For example, a document named "A. Proposal Draft" that was stored at 11:30 on March 8 is displayed in the field 923. "Printed" at the extreme right indicates that this document was printed at least once after it was entered in the personal box. Further, "NG" or the like may be displayed in this field to indicate, for example, that the document could not be entered in the box correctly because the hard disk was full. A document named "B. Conference Materials" that was stored at 21:14 on March 11 is displayed in the field 924. "Print OK" at the extreme right indicates that this document has not been printed since being entered in the personal box and that printing of the document is possible. By way of example, touching this line causes this field to appear shaded, thereby indicating that it has been selected.

A detailed-information key 916 is for displaying details regarding the job on the selected line. By pressing this key, job information such as "Make three double-sided copies on A4-size paper", which has been set by the print window of an application of the host computer, is displayed. This display screen makes it possible to change job information at the user's discretion. For example, the number of copies can be changed from three to five. When print data, which has been saved as a raster image, representing the job on the shaded line is transferred from the host to the personal box, a print key 917 is pressed to start printing in conformity with the set content (displayed by the detailed information key 916) of the specified print job. An erase key 918 is pressed when the job on the shaded line is to be erased. Up and down scroll keys 919, 920 are used to scroll the screen to display a large number of jobs that cannot all be displayed on a single screen. A facsimile status key 922 is pressed to check the send/receive status of the facsimile unit. A close key 921 is pressed to restore the personal box screen 901 of FIG. 10.

If a document to be printed is selected by using the screen 930, the specified document is printed at step S185.

Thus, by pressing the buttons 802 to 805 to enter a personal box number on the personal box screen 801 of the control panel and then entering one's own password using the screen shown in FIG. 14, a desired document in this personal box can be printed.

Further, if a password has not been set in the personal box, the password inputting screen is not displayed and printing of the document can be started without entering a password.

The procedure described above may be summarized as follows: when a first password for registering the personal box has been set using the password setting screen of FIG. 13, a password is required both in a case where a file contained in the personal box is to be printed and in a case where the personal box is to be deleted. The password interrogated in this case is the first password, which was entered using the screen of FIG. 13. In a case where a first password has not been set using the password setting screen of FIG. 13, printing of a file contained in this personal box can be performed without a password. When the personal box is to be deleted, the second password entered using the password setting screen of FIG. 16 is interrogated.

By thus adopting an arrangement in which a password is required for deletion of a personal box from which a file can be printed without need of a password, deletion of the personal box cannot be carried out unless the password for this deletion is known.

Second Embodiment

An arrangement may be adopted in which, rather than separately registering a second password for every personal box, a password separately registered for an administrator is checked when a personal box is to be deleted. If this expedient is adopted, the printing of the content of a personal box can be performed in a manner similar to that of the first embodiment. Further, when a personal box is to be deleted, such deletion cannot be performed without permission because the administrator password will be required.

Other Embodiments

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the invention is applicable also to a case where the object of the invention is attained by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

The present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

Thus, in accordance with the present invention, as described above, registration of a password for maintenance of a personal box is always required. As a result, even if the personal box is one for which a password is not necessary when printing data from the box, it is possible to prevent a maintenance operation such as deletion from being performed on this personal box by an unauthorized user who does not know the password.

It is explained in the above embodiments that a password can be set for each personal box. However, the present invention is not limited to this, and also applicable to a case where a password is set for each print job, and a case where a password is set for each personal box and whether or not the password is required to execute a print job can be set for each print job in the personal box.

In the former case, it is possible to configure the apparatus to inquire a password to a print job (set by a client which issued the print job) to cancel the print job for which the password has been set, and to inquire a password to the personal box to cancel a print job for which no password has been set.

In the latter case, whether or not a password to a print job is required to execute the print job is determined by a client which requested the print job. In this case, it is possible to configure the apparatus to inquire a password to the personal box to cancel the print job regardless of whether or not a password has been set for the print job.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus comprising:
  storage means, which includes a storage area associated with an identifier and a first password and a storage area associated with an identifier and a second password, and which can store a series of printable image data in these storage areas, respectively;
  first determination means for performing a first determination process including a request to a user for inputting a password and a check of an input password inputted in response to the request with the first password associated with a storage area of interest;
  output control means for (i), in accordance with a fact that the first password is registered for the storage area of interest, making said first determination means perform the first determination process and allowing output of image-data from the storage area of interest in accordance with a result of the check of the input password performed by said first determination means, and for (ii), in accordance with a fact that the first password is not registered for the storage area of interest, allowing output of image data from the storage area of interest without performing the first determination process by said first determination means;
  second determination means for performing a second determination process including a request to a user for inputting a password and a check process that selective performs one of a check of an input password inputted in response to the request with the first password and a check of an input password inputted in response to the request with the second password; and
  area freeing control means for causing said second determination means to perform the second determination process in both the case that the first password is registered for the storage area and the case that the first password is not registered for the storage area, and for allowing freedom of the storage area of interest in accordance with a result of the check of the input password performed by said second determination means.

2. The apparatus according to claim 1, further comprising:
  first registration means for registering the first password in association with the storage area of interest; and
  second registration means for registering the second password if the first password has not been registered.

3. The apparatus according to claim 1, wherein the second password is the same for all storage areas.

4. The apparatus according to claim 1, wherein said area freeing control means makes said second determination means check the input password with the second password in accordance with a fact that the first password is not registered for the storage area of interest, and makes said second determination means check the input password with the first password in accordance with a fact that the first password is registered for the storage area of interest.

5. The apparatus according to claim 1, further comprising at least one of means for outputting image data through said storage means from an image scanner included in said image forming apparatus and means for outputting image data through said storage means from an external device.

6. The apparatus according to claim 1, wherein plural image data of plural images can be stored in each storage area of said storage means and mode setting information is stored corresponding to each of the plural images.

7. A method of controlling an image forming apparatus having storage means, which includes a storage area associated with an identifier and a first password and a storage area associated with an identifier and a second password, to store a series of printable image data in the storage areas, respectively, comprising:

a first determination step of performing a first determination process including a request to a user for inputting a password and a check of an input password inputted in response to the request with the first password associated with a storage area of interest;

an output control step of (i), in accordance with a fact that the first password is registered for the storage area of interest, making said first determination step perform the first determination process and allowing output of image data from the storage area of interest in accordance with a result of the check of the input password performed in said first determination step, and for (ii), in accordance with a fact that the first password is not registered for the storage area of interest, allowing output of image data from the storage area of interest without performing the first determination process in said first determination step;

a second determination step of performing a second determination process including a request to a user for inputting a password and a check process that selectively performs one of a check of an input password inputted in response to the request with the first password and a check of an input password inputted in response to the request with the second password; and an area freeing control step of causing said second determination step to perform the second determination process in both the case that the first password is registered for the storage area and the case that the first password is not registered for the storage area, and for allowing freedom of the storage area of interest in accordance with a result of the check of the input password performed in said second determination step.

8. The method according to claim 7, further comprising:

a first registration step of registering the first password in association with the storage area of interest; and a second registration step of registering the second password if the first password has not been registered.

9. The method according to claim 7, wherein the second password is the same for all storage areas.

10. The method according to claim 7, wherein said area freeing control step makes said second determination step check the input password with the second password in accordance with a fact that the first password is not registered for the storage area of interest, and makes said second determination step check the input password with the first password in accordance with a fact that the first password is registered for the storage area of interest.

11. The method according to claim 7, further comprising at least one of a step of outputting image data through said storage means from an image scanner included in the image forming apparatus and a step of outputting image data through said storage means from an external device of the image forming apparatus.

12. The method according to claim 7, wherein image data of plural images can be stored in each storage area of said storage means and mode setting information is stored corresponding to each of the plural images.

13. A computer-readable storage medium storing a program for implementing the following means by a computer having storage means, which includes a storage area associated with an identifier and a first password and a storage area associated with an identifier and a second password, to store a series of printable image data in the storage areas, respectively:

first determination means for performing a first determination process including a request to a user for inputting a password and a check of an input password inputted in response to the request with the first password associated with a storage area of interest;

output control means for (i), in accordance with a fact that the first password is registered for the storage area of interest, making said first determination means perform the first determination process and allowing output of image data from the storage area of interest in accordance with a result of the check of the input password performed by said first determination means, and for (ii), in accordance with a fact that the first password is not registered for the storage area of interest, allowing output of image data from the storage area of interest without performing the first determination process by said first determination means;

second determination means for performing a second determination process including a request to a user for inputting a password and a check process that selectively performs one of a check of an input password inputted in response to the request with the first password and a check of an input password inputted in response to the request with the second password; and area freeing control means for causing said second determination means to perform the second determination process in both the case that the first password is registered for the storage area and the case that the first password is not registered for the storage area, and for allowing freedom of the storage area of interest in accordance with a result of the check of the input password performed by said second determination means.

14. The storage medium according to claim 13, wherein said program further implements the following by means by the computer:

first registration means for registering the first password in association with the storage area of interest; and second registration means for registering the second password if the first password has not been registered.

15. The storage medium according to claim 13, wherein the second password is the same for all storage areas.

16. The medium according to claim 13, wherein said area freeing control means makes said second determination means check the input password with the second password in accordance with a fact that the first password is not registered for the storage area of interest, and makes said second determination means check the input password with the first password in accordance with a fact that the first password is registered for the storage area of interest.

17. An image processing apparatus comprising:

a plurality of print data boxes in which print data is stored;

setting means for setting, for each print data box, a password requirement setting indicating whether a password input is required or not to print the print data stored in the print data box; and password-input requesting means for requesting input of a password to allow a freedom process to invalidate data relevant to a print data box in both a case where the freedom process is performed for a print data box for which the password requirement setting is set in effect by said setting means and a case where the freedom process is performed for a print data box for which the password requirement setting is not set in effect by said setting means.

18. The apparatus according to claim 17, wherein a password requested to be input by said password-input requesting means is the same for all of said plurality of print data boxes.

19. The apparatus according to claim 17, further comprising printing means for printing the print data.

20. The apparatus according to claim 17, wherein when said setting means has set that a password input is required, a password required at the time of printing of print data and a password required at the time of deletion of a print data box are the same.

21. The apparatus according to claim 17, further comprising at least one of means for outputting image data through said storage means from an image scanner included in said image forming apparatus and means for outputting image data through said storage means from an external device.

22. The apparatus according to claim 7, wherein plural print data can be stored in each print data box and mode setting information is stored corresponding to each of the plural print data.

23. A method of controlling an image processing apparatus having a plurality of print data boxes in which print data is stored, comprising;
    a setting step of setting, for each print data box, a password requirement setting indicating whether a password input is required or not to print the print data stored in the print data box; and
    a step of requesting input of a password to allow a freedom process to invalidate data relevant to a print data box in both a case where the freedom process is performed for a print data box for which the password requirement setting is set in effect in said setting step and a case where the freedom process is performed for a print data box for which the password requirement setting is not set in effect in said setting step.

24. The method according to claim 23, wherein a password requested to be input at said password-input requesting step is the same for all of said plurality of print data boxes.

25. The method according to claim 23, further comprising a printing step of printing the print data.

26. The method according to claim 23, wherein when it has been set at said setting step that a password input is required, a password required at the time of printing of print data and a password required at the time of deletion of a print data box are the same.

27. The method according to claim 23, further comprising at least one of a step of outputting image data through said storage means from an image scanner included in the image forming apparatus and a step of outputting image data through said storage means from an external device of the image forming apparatus.

28. The method according to claim 23, wherein plural print data can be stored in each print data box and mode setting information is stored corresponding to each of the plural print data.

29. A computer-readable storage medium storing a program for implementing the following means by a computer having a plurality of print data boxes in which print data is stored:
    setting means for setting, for each print data box, a password requirement setting indicating whether a password input is required or not to print the print data stored in the print data box; and
    password-input requesting means for requesting input of a password to allow a freedom process to invalidate data relevant to a print data box in both a case where the freedom process is performed for a print data box for which the password requirement setting is set in effect by said setting means and a case where the freedom process is performed for a print data box for which the password requirement setting is not set in effect by said settings means.

30. The storage medium according to claim 29, wherein a password requested to be input by said password-input requesting means is the same for all of said plurality of print data boxes.

31. The storage medium according to claim 29, wherein said program further implements printing means for printing the print data.

32. The storage medium according to claim 29, wherein where said setting means has set that a password input is required, a password required at the time of printing of print data and a password required at the time of deletion of a print data box are the same.

33. A control method for controlling an image processing apparatus having storage means including plural storage areas which can hold print data, said method comprising the steps of;
    allowing the image processing apparatus to set, for each of the plural storage areas, whether a first certification processing to allow outputting of print data in a storage area is required or not; and
    allowing the image processing apparatus to execute a second certification processing to allow a freedom process to invalidate data relevant to a storage area in both a case where the freedom process is performed for a storage area for which the first certification processing is required and a case where the freedom process is performed for a storage area for which the first certification processing is not required.

34. A method according to claim 33, wherein said image processing apparatus further has at least one of a function for outputting image data through said storage means from an image scanner included in said image processing apparatus and a function for outputting image data through said storage means from an external device of the image processing apparatus.

35. A method according to claim 33, wherein plural print data can be stored in each storage area and mode setting information is stored corresponding to each of the plural print data.

36. A method for processing a print job held in a storage unit, comprising the steps of:
    causing a user interface unit to require inputting of certification data in a case where a print job, held in the storage unit, which requires a certification processing to print is printed, and not to require the inputting of certification data in a case where a print job, held in the storage unit, which does not require the certification processing to print is printed; and
    causing said user interface unit to require the inputting of certification data in both a case where a print job, held in the storage unit, which requires said certification processing to print is invalidated and a case where a print job, held in the storage unit, which does not require the certification processing to print is invalidated.

37. The method according to claim 36, further comprising a step of causing the storage unit to hold a print job, wherein the storage unit is capable of holding plural print jobs included in an image processing apparatus having a printer unit.

38. The method according to claim 36, further comprising a step of causing the storage unit to hold a print job output from a computer in a bitmap format.

39. The method according to claim 36, further comprising a setting step of setting, for each print job by a client, a certification setting indicating whether or not the certification processing is required for performing the printing processing, wherein, in said setting step, the printing processing is controlled to require a user to input the certification data in a case wherein the print job for which the certification setting is set in effect is performed, and wherein, in said setting step, the printing processing is controlled not to require a user to input the certification data in a case where the print job for which the certification setting is not set in effect is performed.

40. The method according to claim 36, wherein the certification data includes a password.

41. The method according to claim 36, wherein the invalidation processing of the print job includes a cancellation processing for cancelling the print job held in the storage unit.

* * * * *

UNITED STATES PATENT AND TRADEMARK OFFICE
CERTIFICATE OF CORRECTION

PATENT NO. : 6,745,334 B1
DATED : June 1, 2004
INVENTOR(S) : Hideyuki Ikegami

It is certified that error appears in the above-identified patent and that said Letters Patent is hereby corrected as shown below:

<u>Title page,</u>
Item [*] Notice, should read: -- This patent issued on a continued prosecution application filed under 37 CFR 1.53(d), and is subject to the twenty year patent term provisions of 35 U.S.C. 154(a)(2) -- should be inserted.

<u>Column 2,</u>
Line 9, "illustrated" should read -- illustrate --.

<u>Column 4,</u>
Line 19, "stabled" should read -- stapled --.
Line 56, "where" should read -- which --.

<u>Column 6,</u>
Line 13, "(A/D.SH)" should read -- (A/D•SH) --.

<u>Column 7,</u>
Line 22, "where" should read -- which --.

<u>Column 13,</u>
Line 35, "(.)" should read -- (•) --.
Line 43, "it determined" should read -- it is determined --.

<u>Column 16,</u>
Line 13, "image-data" should read -- image data --.
Line 23, "selective" should read -- selectively --.

<u>Column 19,</u>
Line 13, "claim 7" should read -- claim 17 --.

UNITED STATES PATENT AND TRADEMARK OFFICE
CERTIFICATE OF CORRECTION

PATENT NO.     : 6,745,334 B1
DATED          : June 1, 2004
INVENTOR(S)    : Hideyuki Ikegami It is certified that error appears in the above-identified patent and that said Letters Patent is hereby corrected as shown below:

Column 20,
Line 2, "settings" should read -- setting --.

Column 21,
Line 6, "wherein" should read -- where --.

Signed and Sealed this

Fifth Day of April, 2005

JON W. DUDAS
*Director of the United States Patent and Trademark Office*

UNITED STATES PATENT AND TRADEMARK OFFICE
CERTIFICATE OF CORRECTION

PATENT NO. : 6,745,334 B1  Page 1 of 1
DATED : June 1, 2004
INVENTOR(S) : Hideyuki Ikegami It is certified that error appears in the above-identified patent and that said Letters Patent is hereby corrected as shown below:

<u>Title page,</u>
Item [56], References Cited, U.S. PATENT DOCUMENTS,

| | | | |
|---|---|---|---|
| -- 6,559,967 B1 | 05/2003 | Akiba et al. | 358/1.16 |
| 6,476,933 B1 | 11/2002 | Honma | 358/1.9 |
| 6,473,098 B1 | 10/2002 | Wakai et al. | 345/743 |
| 6,249,356 B1 | 06/2001 | Yoshikawa et al. | 358/402 |
| 6,247,011 B1 | 06/2001 | Jecha et al. | 707/9 |
| 6,421,523 B1 | 07/2002 | Kondo et al. | 399/404 |
| 6,141,662 A | 10/2000 | Jeyachandran | 707/2 |
| 5,870,206 A | 02/1999 | Ouchi | 358/402 |
| 5,727,050 A | 03/1998 | Mori et al. | 379/100.09 |
| 5,283,665 A | 02/1994 | Ogata | 358/434 -- | should be inserted.

OTHER PUBLICATIONS,
-- "Canon U.S.A. Beefs Up Security; Network Security and Image Overwrite Protection Now Available for Canon imageRUNNER Product Line, Keeping Your Important Data Safe", May 21, 2002, Business Wire, p. 2518.
Alvich-Lopinto, "Plain-paper facts" June 1990, Home Office Computing, Vol. 8, #6, pg. 18.
"Cebit-Hewlett-Packard budget plain paper fax machines" March 24, 1994, Newsbytes. -- should be inserted.

Signed and Sealed this

Twenty-fourth Day of May, 2005

JON W. DUDAS
*Director of the United States Patent and Trademark Office*